US006351558B1

(12) United States Patent
Kuwata

(10) Patent No.: US 6,351,558 B1
(45) Date of Patent: *Feb. 26, 2002

(54) IMAGE PROCESSING SYSTEM, IMAGE PROCESSING METHOD, AND MEDIUM HAVING AN IMAGE PROCESSING CONTROL PROGRAM RECORDED THEREON

(75) Inventor: Naoki Kuwata, Nagano (JP)

(73) Assignee: Seiko Epson Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,885

(22) Filed: Nov. 5, 1997

(30) Foreign Application Priority Data

| Nov. 13, 1996 | (JP) | ............................................. 8-302233 |
| Nov. 18, 1996 | (JP) | ............................................. 8-306370 |
| Nov. 18, 1996 | (JP) | ............................................. 8-306371 |
| Nov. 21, 1996 | (JP) | ............................................. 8-311070 |

(51) Int. Cl.$^7$ ................................................. G06K 9/00
(52) U.S. Cl. ..................... 382/168; 382/162; 382/172; 382/274
(58) Field of Search ................................. 382/168, 162, 382/169–172, 274

(56) References Cited

U.S. PATENT DOCUMENTS

| 4,831,434 A |   | 5/1989 | Fuchsberger |
| 5,046,118 A | * | 9/1991 | Ajewole et al. ............ 382/169 |
| 5,121,224 A |   | 6/1992 | Ng et al. |
| 5,181,105 A |   | 1/1993 | Udagawa et al. ............. 358/80 |
| 5,280,367 A |   | 1/1994 | Zuniga |
| 5,450,217 A |   | 9/1995 | Eschbach et al. ............ 358/518 |

FOREIGN PATENT DOCUMENTS

| EP | 0 413 557 A2 | 2/1991 |
| EP | 0 413 557 A3 | 2/1991 |
| EP | 0 516 083 A2 | 12/1992 |

(List continued on next page.)

OTHER PUBLICATIONS

J.C.Russ, "The Image Processing Handbook", second edition, CRC Press, 1995, p. 38.*
K.S. Trivedi, "Probability and Statistics with Reliability, Queuing, and Computer Science Applications", Prentice–Hall, Inc.,pp. 484–490, 1982.*
John C Ross, "The Image Processing Handbook", 2nd ed., CRC Press, Inc., pp. 25,26,215–220, 1995.*
European Search Report.

*Primary Examiner*—Phuoc Tran
(74) *Attorney, Agent, or Firm*—Sughrue Mion, PLLC

(57) ABSTRACT

Heretofore, an operator has been required to judge the type of image on a display and select any of various effect processings manually, thus automation has been impossible. By totaling luminance values of pixels into a luminance distribution which pixels have been selected by a thinning-out processing for image data (step S102) it becomes possible to count the number of colors used (step S104). As a result, if the number of colors used in image data is large, it can be judged that the image data is of a natural picture. Besides, a contrast enlarging process (step S110), a saturation highlighting process (step S112) and an edge highlighting process (S114), which are suitable for application to a natural picture on the basis of the results of such judgment, can be selected automatically while changing the respective highlighting degrees. Also in a printing process, if an inputted image is a natural picture, there is performed a color transformation using a pre-gray level transformation (S508), while if the image is not a natural picture, there is performed a color transformation using a combination of cache + interpolating operation (S506), and thus it is possible to automatically select a color transformation processing of a small processing volume.

17 Claims, 22 Drawing Sheets

FOREIGN PATENT DOCUMENTS

| | | |
|---|---|---|
| EP | 0 536 821 A1 | 4/1993 |
| EP | 0 590 997 A2 | 4/1994 |
| EP | 0 723 364 A2 | 7/1996 |
| EP | 0 794 653 A2 | 9/1997 |
| EP | 0 794 653 A3 | 2/2000 |
| JP | 1-207885 | 8/1989 |
| JP | 6-124329 | 5/1994 |
| WO | WO 86/06905 | 11/1986 |

\* cited by examiner

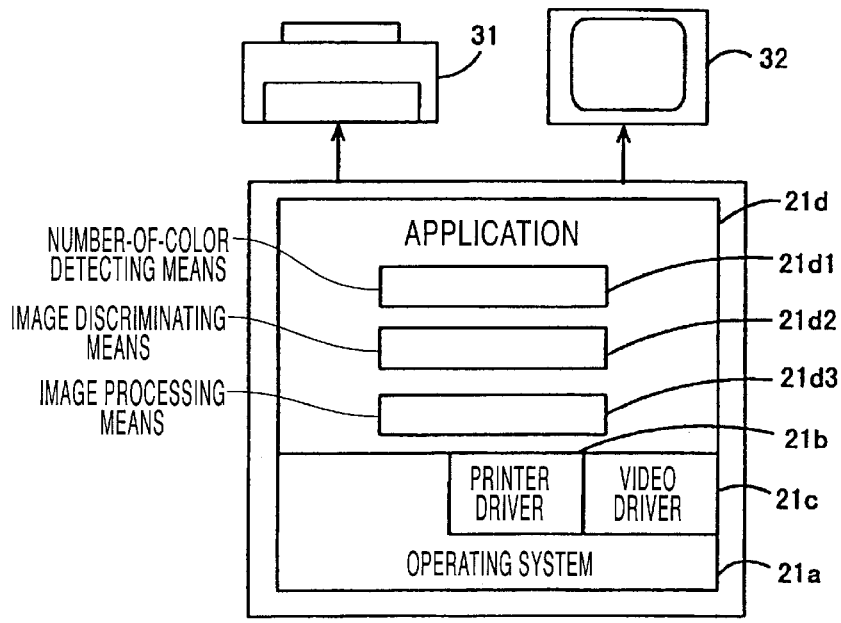
FIG. 2
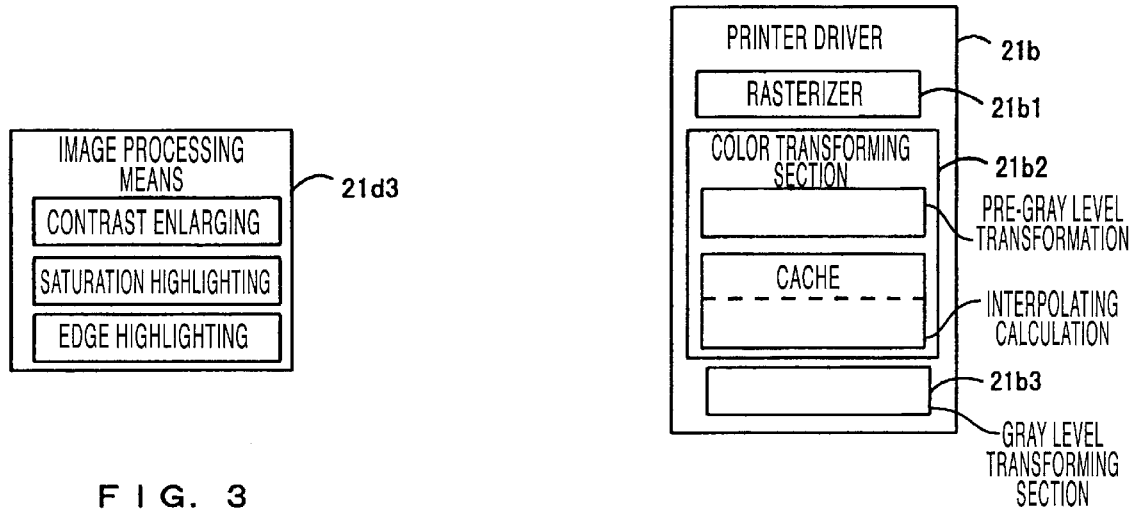
FIG. 3
FIG. 4

FIG. 11(a)
FIG. 11(b)
FIG. 11(c)
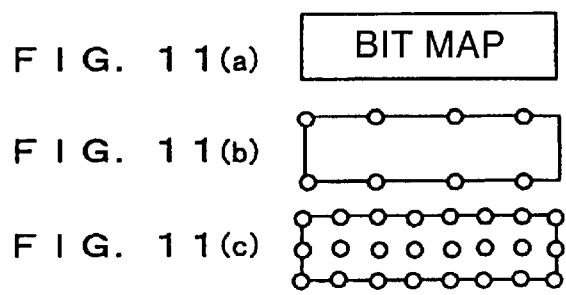
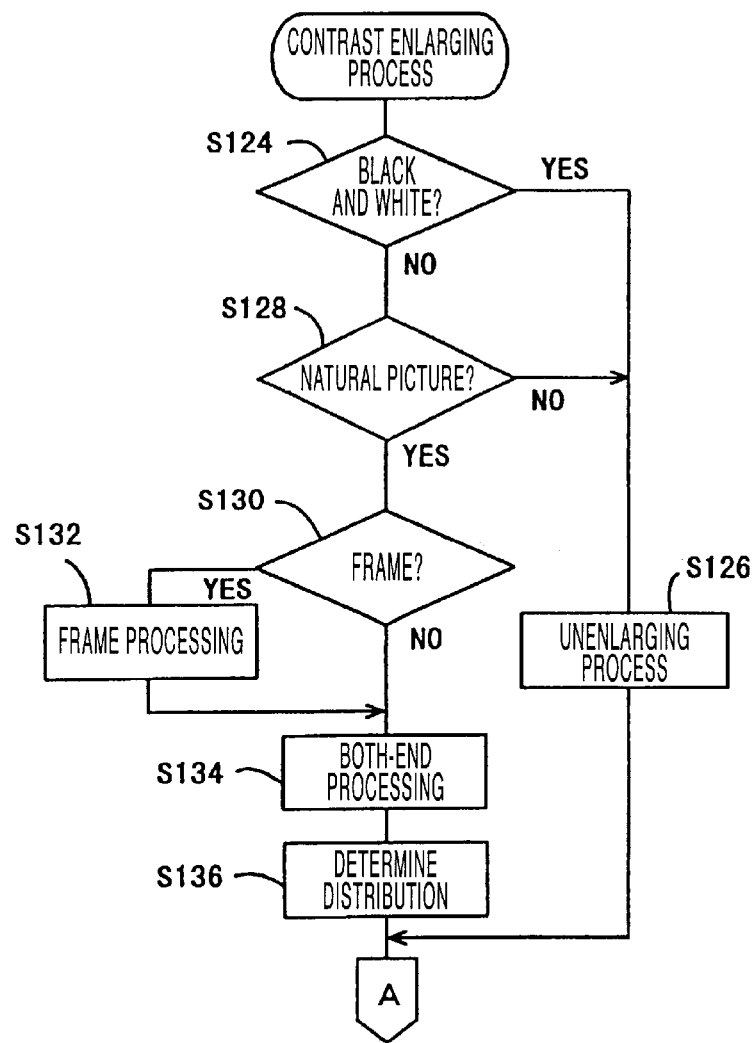
FIG. 12

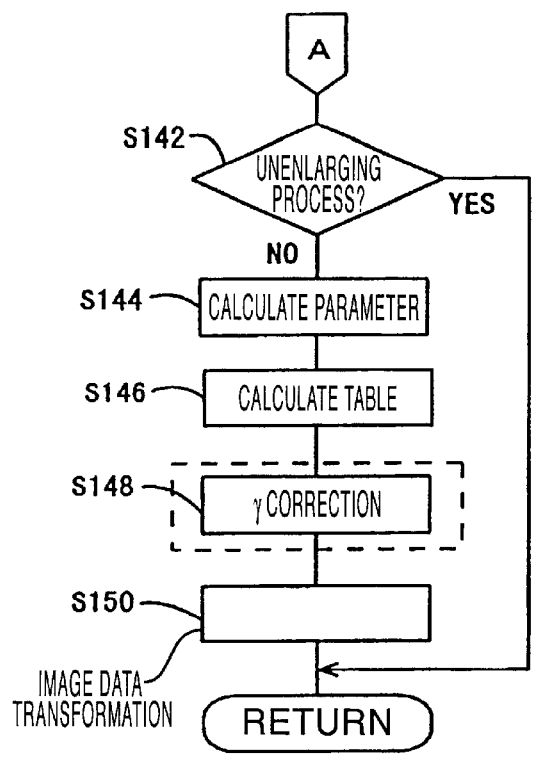
FIG. 13
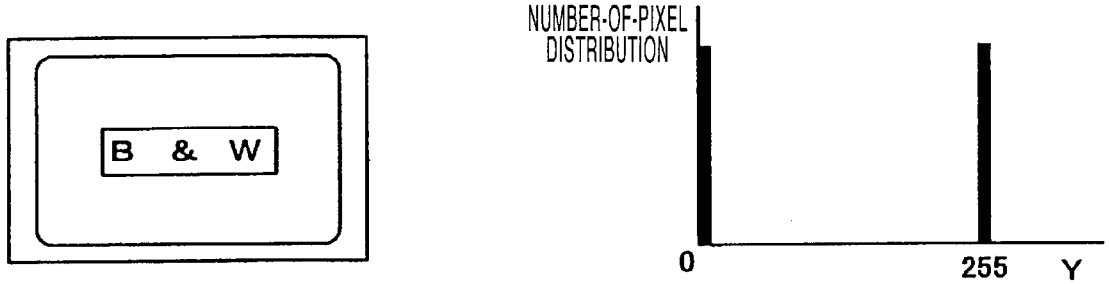
FIG. 14
FIG. 15

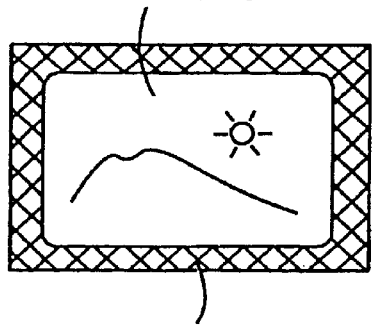
NATURAL PICTURE
BLACK OR WHITE FRAME
F I G. 1 6
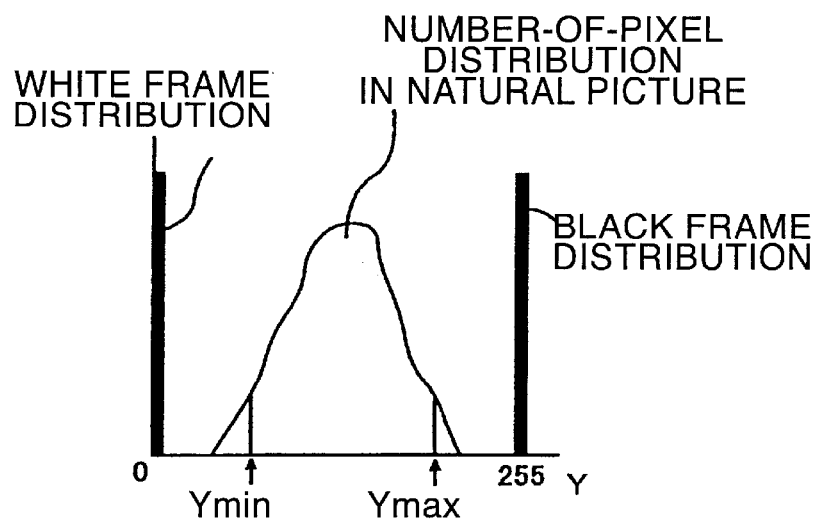
F I G. 1 7
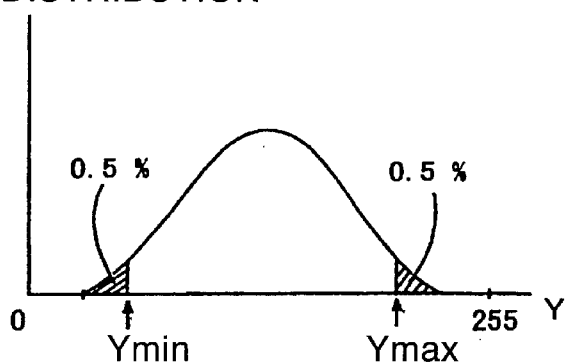
F I G. 1 8

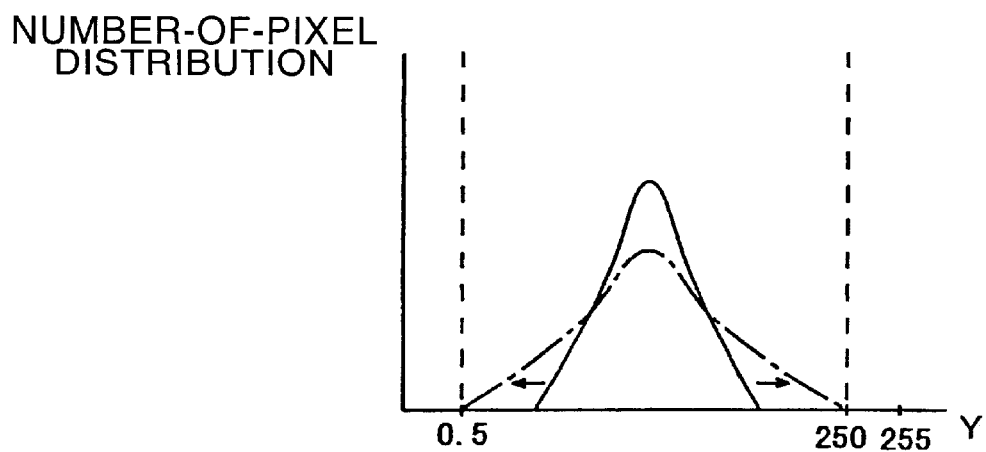
F I G. 19
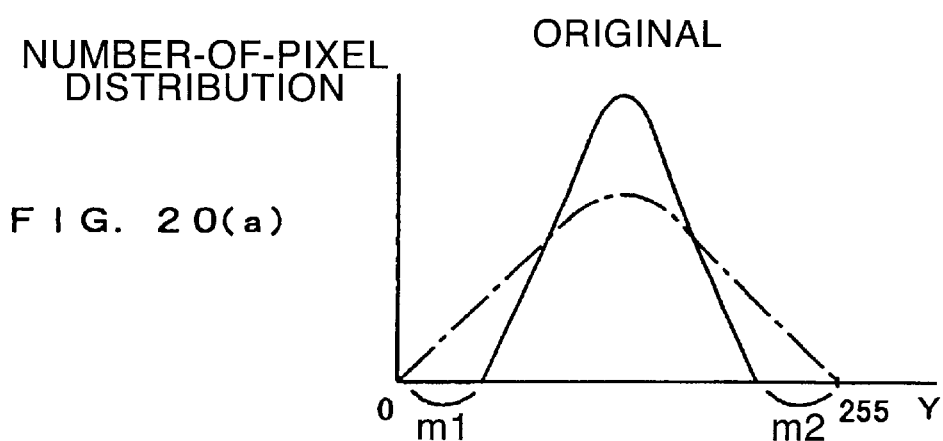
F I G. 20(a)
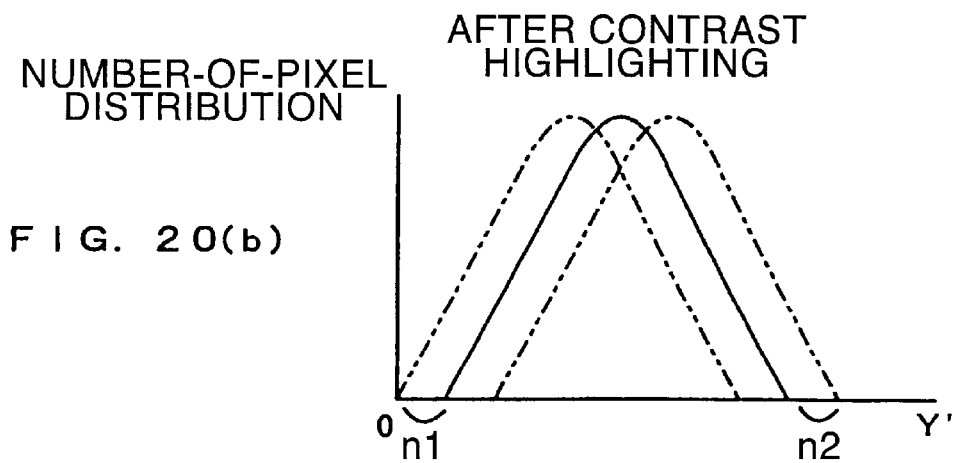
F I G. 20(b)

| y | Y |
|---|---|
| ⋮ | ⋮ |
FIG. 21
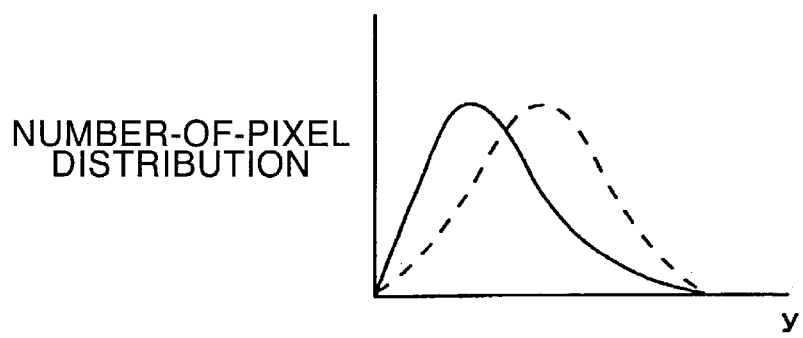
FIG. 22
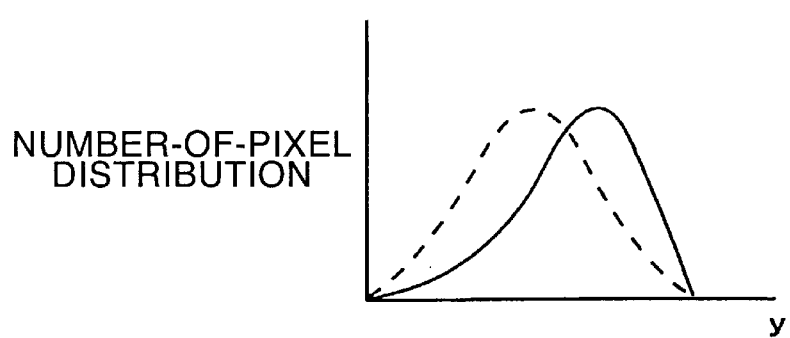
FIG. 23

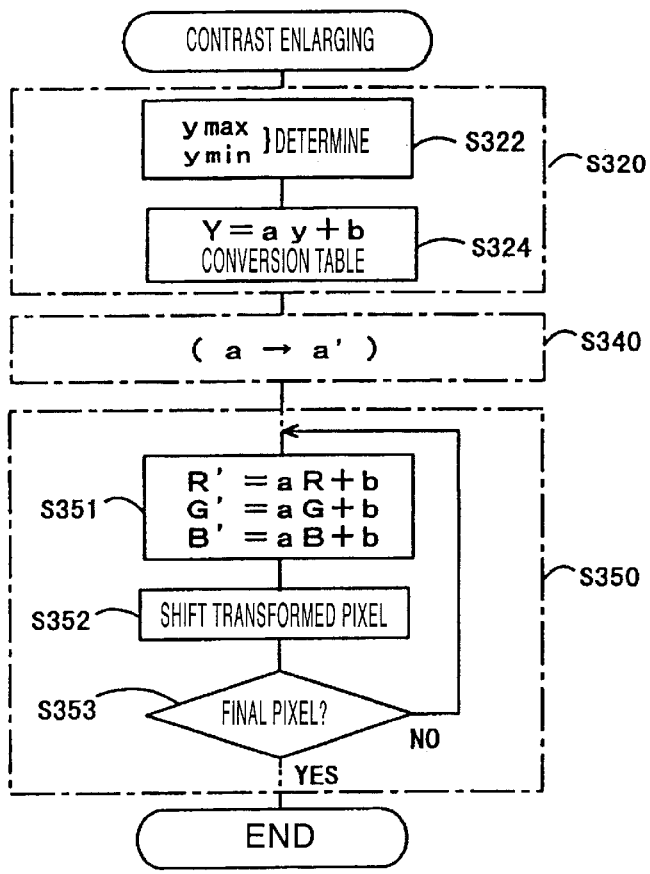
F I G. 3 2
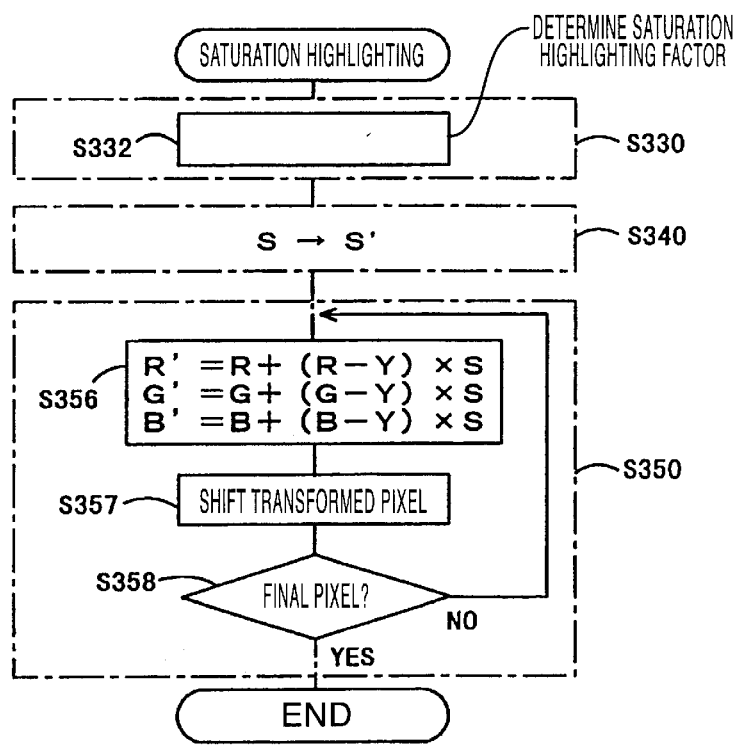
F I G. 3 3

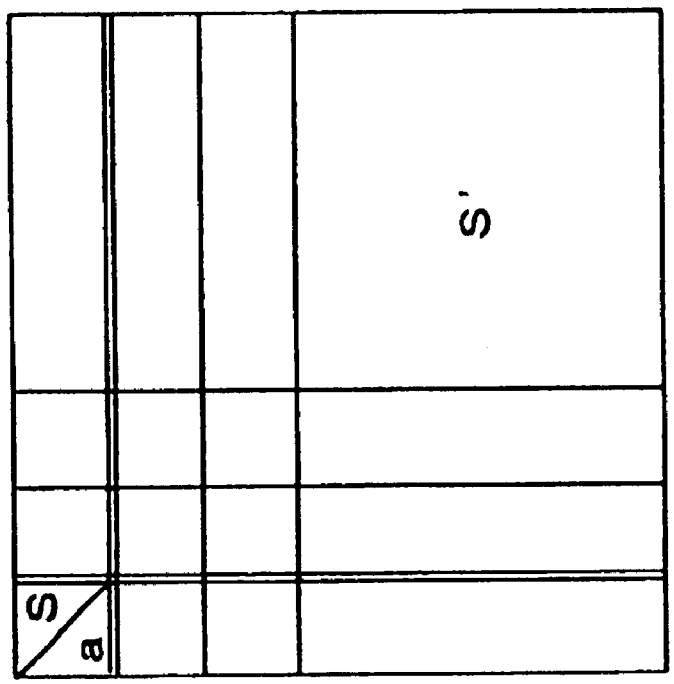
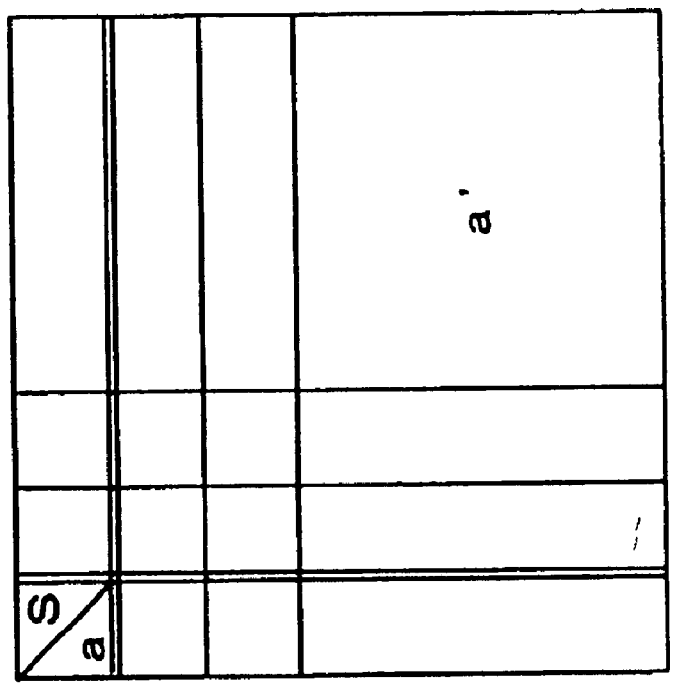
FIG. 37

F I G. 3 8 (A)
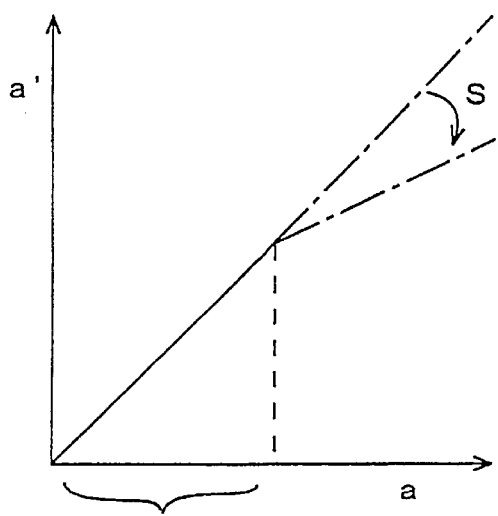
F I G. 3 8 (B)
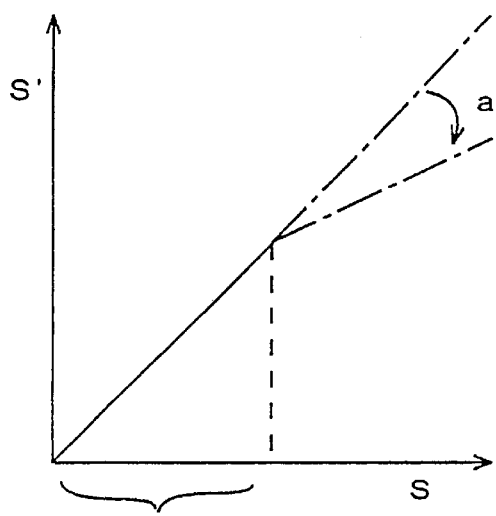

7×7

| 0 | 0 | 1 | 1 | 1 | 0 | 0 |
|---|---|---|---|---|---|---|
| 0 | 2 | 8 | 14 | 8 | 2 | 0 |
| 1 | 8 | 37 | 61 | 37 | 8 | 1 |
| 1 | 14 | 61 | 100 | 61 | 14 | 1 |
| 1 | 8 | 37 | 61 | 37 | 8 | 1 |
| 0 | 2 | 8 | 14 | 8 | 2 | 0 |
| 0 | 0 | 1 | 1 | 1 | 0 | 0 |

40  632

F I G. 40

5×5

| 2 | 8 | 14 | 8 | 2 |
|---|---|---|---|---|
| 8 | 37 | 61 | 37 | 8 |
| 14 | 61 | 100 | 61 | 14 |
| 8 | 37 | 61 | 37 | 8 |
| 2 | 8 | 14 | 8 | 2 |

41

F I G. 41

| 6 | 7 | 8 |
|---|---|---|
| 5 | X | 1 |
| 4 | 3 | 2 |

F I G. 42

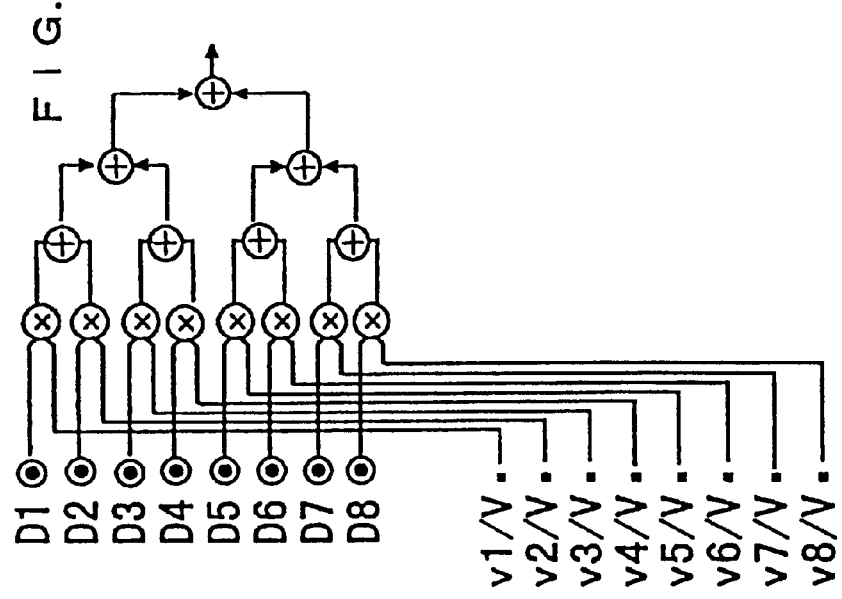
F I G. 45(c)
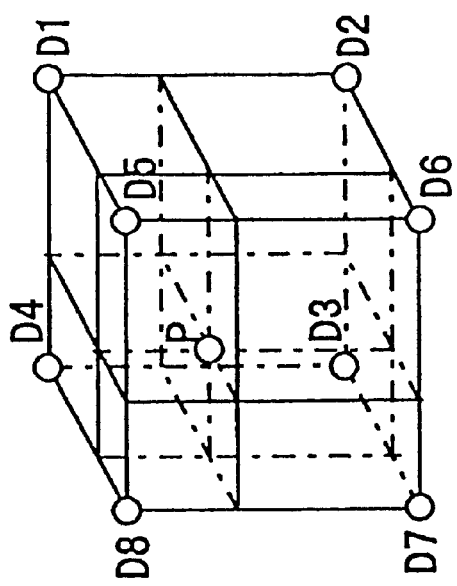
F I G. 45(a)
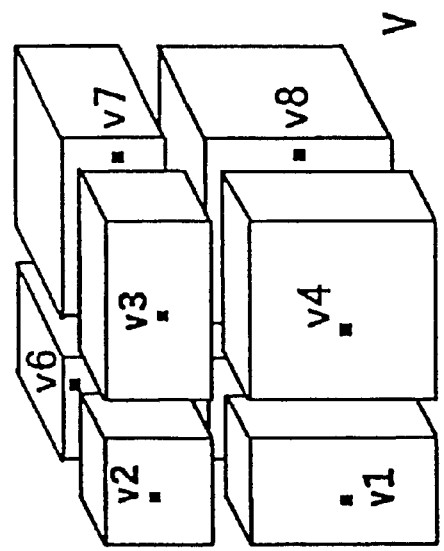
F I G. 45(b)

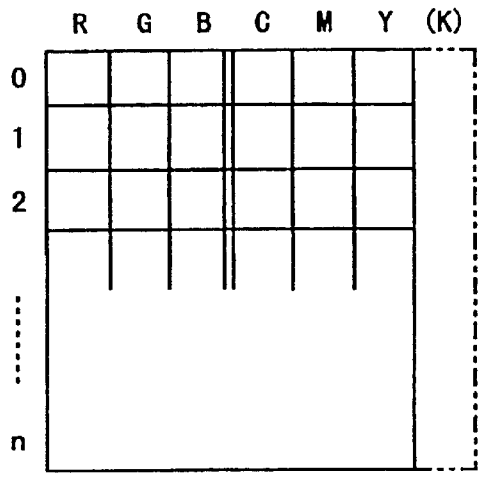
F I G. 46
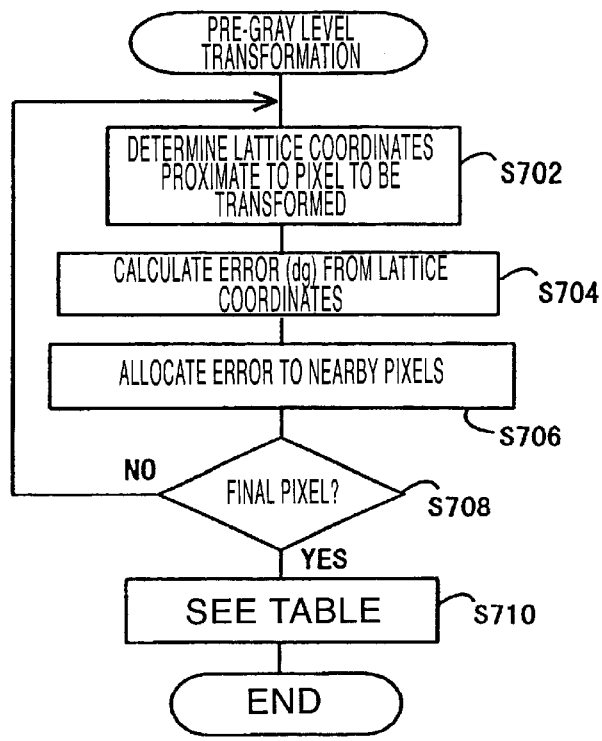
F I G. 47
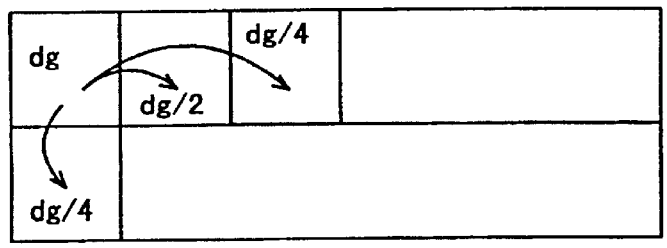
F I G. 48

IMAGE PROCESSING SYSTEM, IMAGE PROCESSING METHOD, AND MEDIUM HAVING AN IMAGE PROCESSING CONTROL PROGRAM RECORDED THEREON

BACKGROUND OF THE INVENTION

1. Field of the Invention

The present invention relates to an image processing system, an image processing method, and a medium having an image processing control program recorded thereon. Particularly, the invention is concerned with an image processing system and method for executing an optimum image processing with use of a computer, as well as a medium having an image processing control program recorded thereon.

2. Description of the Prior Art

Heretofore, for image data of natural pictures such as photographs and image data of drawing type unnatural pictures, there have been known software such as photoretouch for performing various effect processing. In such software image data are displayed on a display or the like, to which an operator applies a desired processing to form nice-looking image data.

For example, in the case of reading a photograph through a scanner to obtain electronic image data, it is sometimes desired to highlight the contrast and vividness of the image.

As a method for enlarging the contrast of image data there is known the method disclosed in Japanese Patent Publication No. 66318/95, in which the relation the luminance y before transformation and the luminance y' after transformation are correlated with each other according to the following expression (1), and the luminance of image data is transformed on the basis of parameter "a" or "b" selected by an operator, whereby there is obtained a contrast-highlighted image from image data weak in contrast:

$$y'=ay+b \tag{1}$$

On the other hand, as a method for highlighting saturation to highlight the vividness there is known a method wherein the value of a desired color component is increased in the case where the color components of image data are represented in terms of gradation data of red (R), green (G) and blue (B).

More particularly, when the gradation data is in the range of 0 to 255, 20 is always added to the gradation data of red to make red color more vivid, or 20 is always added to the gradation data of blue to make blue color more vivid.

Thus, among various effect processing there is included one which transforms natural pictures into more beautiful pictures, while some images are not required to be retouched, such as drawing type images.

In the latter case, in an image processing system using the above conventional software, the operator is required to judge the type of image on the display and select an appropriate effect processing from among various ones or judge the degree of the processing. Thus, it has been impossible to automate this operation.

For example, it has so far been impossible to judge automatically whether contrast should be highlighted or not or whether vividness should be highlighted or not.

In highlighting contrast, the conventional methods merely adopt the technique of providing plural settings different in strength of contrast beforehand and then switching over from one to another. Thus, it has been impossible to automatically selected the most preferred one corresponding to the actual image data. Particularly, when luminance is changed in accordance with the foregoing expression (1), the result is such that only brightness is highlighted in the case of an image which is bright as a whole, or only darkness is highlighted in the case of an image which is dark as a whole.

Needless to say, the strength of contrast can be adjusted in television for example, but the parameter "b", namely offset, is uniform and it has been impossible to effect an optimum highlighting for each individual image.

Also as to highlighting vividness, a man is required to judge to what degree of highlighting is to be performed with respect to each image data, and it has been impossible to select the best suited highlighting automatically.

Further, as to not only the contrast enlarging processing but also the saturation highlighting processing, there is a tendency to increase in value of image data. Therefore, if saturation is to be highlighted after highlighting of contrast, a loud image results. This is not desirable.

In this connection, in the above conventional image processing system, if one is adjusted to an appropriate condition and thereafter the other is adjusted, the result of the previous adjustment goes wrong and thus it is difficult to make adjustment as desired.

In U.S. Pat. No. 5,181,105 there is disclosed a technique of diminishing the contrast width of image data automatically in view of the point that a color space reproducible in a CRT display is larger than that in a video printer. In this case, all that is required is merely causing image data to enter the color space in the video printer which is known in advance. Thus, automation is feasible because only such reduction of the contrast width is needed irrespective of the type of image. Such an automation has nothing to do with the foregoing effect processing that intends to make the most of the image quality of the image data. Thus, the application of the aforesaid technique is meaningless.

SUMMARY OF THE INVENTION

Accordingly, it is an object of the present invention to provide an image processing system, an image processing method, and a medium having an image processing control program recorded thereon, capable of judging the type of image automatically on the basis of image data and performing an optimum image processing.

The image processing system according to the present invention comprises a number-of-color detecting means which inputs image data representing information of each of pixels resolved in a dot matrix form from an image and which detects the number of colors used while regarding information corresponding to the luminance of each pixel as color, and an image discriminating means for judging the type of image on the basis of the number of colors thus detected.

The image processing method according to the present invention performs a predetermined image processing for image data which represents information of each of the pixels resolved in a dot matrix form from an image. The same method comprises inputting the said image data, detecting the number of colors used while regarding information corresponding to the luminance of each pixel as color, and judging the type of image on the basis of the number of colors thus detected.

Further, the medium according to the present invention has an image processing control program recorded thereon for inputting to a computer image data which represents information of each of the pixels resolved in a dot matrix form from an image and for performing a predetermined processing. The said image processing control program includes the step of inputting the said image data and detecting the number of colors used while regarding information corresponding to the luminance of each pixel as color and the step of judging the type of image on the basis of the number of colors thus detected.

In the present invention thus constructed, when the number-of-color detecting means detects image data which represents information of each pixel resolved in a dot matrix form from an image, it detects the number of colors used while regarding information corresponding to the luminance of each pixel as color, and the image discriminating means judges the type of image on the basis of the number of colors thus detected.

The number of colors used differs depending on the type of image. For example, in the case of a natural picture such as a photograph, even if the object to be photographed is of the same blue color, plural colors are detected due to a shadow and thus a considerable number of colors may be used. On the other hand, in the case of a drawing type data or a business graph, a limit is encountered in the number of colors used because it has been drawn with colors designated by an operator.

According to the present invention, from the standpoint of the number of colors used, it is possible to judge the type of image automatically on the basis of image data. Needless to say, images including a large number of colors used correspond to natural pictures. If the number of colors used is large, the image discriminating means judges that the image concerned is a natural picture, while if the number of color used is small, the image discriminating means judges that the image concerned is a business graph or the like. In connection with this image data, information corresponding to each pixel represents color directly or indirectly. Image data covers component values of plural elementary colors, coordinate values of a known absolute color space, and the brightness of a monotone.

According to one method for detecting the number of colors used, actual colors of matrix pixels are judged and totaled in a histogram form for detection. However, in the sense of judging the type of image, an exact value is not always needed.

On the other hand, each color and luminance are correlated with each other, and although plural colors correspond to a single luminance value, there does not occur that the number of luminance values is large and that of color is small. Besides, it is actually inconceivable that an image is constructed of only colors of the same luminance value. Thus, it can be said that a rough tendency as to whether the number of colors used is large or not can be judged in terms of luminance values.

According to the present invention, therefore, by replacing the number of colors used with luminance, it becomes easy to effect totaling even when the number of reproducible colors is very large. Thus, the "number of colors used" as referred to herein is of a broad concept corresponding to the number of colors.

In totaling luminance values, image data sometimes include luminance data directly or may include luminance data only indirectly. In the case of direct luminance data, it suffices to make transformation thereof, or even in the case of indirect luminance data, it suffices to first transform it into luminance data and thereafter performs a predetermined luminance transformation. However, it is not that the transformation of luminance must be extremely accurate, but it can be said that a rough transformation will do.

Therefore, it is another object of the present invention to provide an image processing system capable of obtaining luminance more easily even when image data does not include any element that represents luminance directly.

In the image processing system according to the present invention, in the case where image data is represented in terms of plural component values corresponding to luminance, the number-of-color detecting means determines a luminance by weighted integration of the said component values.

Despite the merit of using luminance, if there is included no luminance component in the parameter of image data, it is necessary to make color transformation. Usually, a large number of processings are required for color transformation. In this connection, since a slight error is allowed at the time of utilizing luminance, in the case where image data is represented in terms of plural component values corresponding to luminance, luminance can be determined by weighted integration of the component values without requiring a large number of processings. For example, where image data is represented by the gradation data of RGB (red, green, blue), it can be said that the component values of red, green and blue each correspond to luminance. For this reason it can be said that a linear addition of the component values represent luminance enough. Thus, this can be an extremely easy method for transformation.

There also are available other methods for simplifying the detection of the number of colors used. For example, a lattice shape sporadic in each axial direction is considered in a three-dimensional color space, and it is assumed that each group represents one color. By so doing, it is no longer required to total a very large number of colors such as, for example, 256 gray scales in each axis.

On the other hand, in the case of a large image data, even a mere totaling of the number of colors used requires a considerable volume of processing. In view of this point it is a further object of the present invention to provide an image processing system capable of totaling the number of colors used in a more simple manner.

According to this image processing system, the number-of-color detecting means makes sampling of pixels substantially uniformly from among all the pixels and the number of colors is detected on the basis of the image data concerning the sampled pixels.

Since the number of colors used is not always required to be strict, it is not always necessary that the totaling of colors throughout the whole image data be conducted for all the pixels.

Needless to say, although an error results from thinning-out, since it is not necessary to know an exact number of colors used, as mentioned above, it suffices to detect the number of colors with respect to pixels sampled uniformly from among all the pixels, whereby the number of pixels and hence the amount of processing are decreased.

For ensuring a certain degree of randomness by such sampling it is necessary to ensure an appropriate sampling ratio. Since an image is planar, the associated image data are inevitably distributed in both longitudinal and transverse directions. But in determining a sampling ratio, by ensuring an appropriate number of pixels sampled at least on the shorter side, it becomes possible to maintain a sureness proportional to the sampling ratio to be determined.

On the other hand, the image data having been subjected to image processing can be applied not only to display but also to various other purposes, including printing. In printing, it is necessary to make transformation into a color space of printing ink different from that of the original image data. But in relation to the number of colors used, the type of image exerts a great influence on the amount of processing in such color transformation. In view of this point it is a further object of the present invention to provide an image processing system capable of selecting and executing an optimum color transformation processing according to the type of image.

This image processing system comprises a pre-gray level transforming means provided with a table having lattice points in a color-specification space of data to be transformed in association with colorimetric gradation data in a color-specification space of data after transformation, the pre-gray level transforming means performing a gray level transformation of colorimetric gradation data before transformation into those corresponding to the lattice points in the said table, then referring to the same table and reading the corresponding colorimetric gradation data for color transformation; an interpolating color transformation means capable of making color transformation into corresponding colorimetric gradation data by interpolating calculation between lattice points in the above table and having a storage area capable of reading data at high speed and storing information on that color transformation, the interpolating color transformation means utilizing a cache for color transformation by an interpolating calculation in the case of information not stored in the said storage area; a color transformation selection control means which, in the case of a natural picture having a large number of colors used in the image data, makes color transformation with use of the pre-gray level transforming means and which, in the case of an image having a small number of colors in the image data and being not a natural picture, makes color transformation with use of the interpolating color transformation means.

In the case of making color transformation between different color-specification spaces, a table is provided in which gradation data in the color-specification space after transformation are associated with the lattice points in the like space before transformation, and corresponding data at predetermined lattice points are read out successively by referring to the said table, whereby it is made possible to effect transformation. However, if there are provided lattice points corresponding to all the gray scale values of the gradation data before transformation, the table becomes too large. For this reason, for example by error diffusion, the pre-gray level transforming means makes a gray level transformation of the gradation data before transformation into gradation data corresponding to the lattice points in the table to thereby reduce the size of the table. Also as to the other gradation data than at the table lattice points, transformation can be done by interpolating calculation. In the case where the number of colors is large, the gray level transformation executed by error diffusion for example is characteristic in that the amount of calculation is sure to become smaller.

However, this method requires that the error diffusion processing must be performed for all the pixels. Therefore, in the case of an unnatural picture which is small in the number of colors used, the result obtained by a single transformation can be utilized many times. In such a case, the interpolating color transformation means utilizing a cache may be advantageous at a point of processing speed, from the function of repeating the processing of storing the result of color transformation in the high-speed readable storage area while performing an interpolating calculation and reading it from the storage area if necessary.

According to the present invention, therefore, in the case of a natural picture using a large number of colors, it is possible to make color transformation at a minimum amount of calculation in accordance with the error diffusion technique for example, while in the case where the number of colors used is small, the result of transformation can be utilized repeatedly by using a cache. Thus, the amount of processing can be kept to a minimum by a color transformation method adopted in accordance with the type of image.

Judgment of the type of image can also be utilized for judgment as to whether edge highlighting is to be performed or not. It is therefore a further object of the present invention to provide an image processing system capable of judging whether edge highlighting is to be performed or not.

This image processing system comprises a natural picture discriminating means which, in the case where the number of colors judged on the above image date is a predetermined number of colors or more, judges that the image data represents a natural picture, and an edge emphasizing means which, when the image data is judged to be a natural picture by the natural picture discriminating means, determines a low-frequency component on the basis of a marginal pixel distribution with respect to each of the pixels which constitute the image data, and diminishes the low-frequency component, thereby eventually making a modification so as to enhance the edge degree of each pixel.

In the present invention constructed as above, when the number of colors judged on the image data is a predetermined number or more, the natural picture discriminating means judges that the image data represents a natural picture. When this judgment is made by the natural picture discriminating means, the edge highlighting means determines a low-frequency component on the basis of a marginal pixel distribution with respect to each of the pixels which constitute the image data, and diminishes the low-frequency component, thereby eventually making a modification so as to enhance the edge degree of each pixel. Thus, when the image data represents a natural picture, there is performed an image processing for edge highlighting, while when it is an unnatural image, there is not performed edge highlighting.

In the case of a photograph as an example, certain photographing conditions afford a blurry image whose edge is blunt. To prevent this inconvenience, an image processing is sometimes conducted. More specifically, when the number of colors in image data detected by the number-of-color detecting means is large, it is judged that the image data represents a natural picture, and in this case there is performed an image processing for edge highlighting. Needless to say, the degree of edge highlighting can be changed as necessary.

It is not necessary that the automation based on image data be limited to the judgment of image type. For example, in the case of a natural picture, it is preferable that its contrast be adjustable automatically. It is therefore a further object of the present invention to provide an image processing system, an image processing method, and a medium having an image processing control program recorded thereon, capable of adjusting contrast automatically on the basis of image data.

This image processing system comprises a luminance distribution totaling means which inputs image data representing information of each of pixels resolved in a matrix form from an image and which totals luminance values of the pixels into a luminance distribution as a whole on the basis of the luminance of each pixel, and an image data luminance transforming means which, when the thus-totaled luminance distribution is not widely dispersed in an effective luminance range of the image data, transforms the luminance information of each pixel in the image data so that the above luminance distribution covers widely the luminance range.

The image processing method according to the present invention performs a predetermined image processing for image data which represents information of each of pixels resolved in a dot matrix form from an image. According to this method, luminance values of the pixels are totaled into a luminance distribution as a whole on the basis of the luminance of each pixel, and when the thus-totaled luminance distribution is not widely dispersed in an effective luminance range of the image data, the luminance information of each pixel in the image data is transformed so that the luminance distribution widely covers the said luminance range.

The medium according to the present invention has an image processing control program recorded thereon for inputting to a computer image data which represents information of each of pixels_ resolved in a dot matrix form from an image and for performing a predetermined image processing. The image processing control program comprises the steps of inputting the image data and totaling luminance values of the pixels into a luminance distribution as a whole, and when the thus-totaled luminance distribution is not widely dispersed in an effective luminance range of the image data, transforming the luminance information of each pixel in the image data so that the luminance distribution widely covers the said luminance range.

In the present invention thus constructed, what is called the width of contrast in the image data can be digitized to some extent by determining a luminance distribution in the image data, and after the digitization can be done, the said distribution is enlarged correspondingly to a reproducible range. It is not that the digitization always requires concrete numerical values.

In the course of processing, the data may be treated as a numerical value or as the magnitude of signal.

To be more specific, for determining a related luminance distribution in handling image data of a predetermined image, the luminance distribution detecting means detects a luminance distribution of the image data in the unit of pixel. Then, using this detected luminance distribution, the image data luminance transforming means judges an amount of enlargement of the luminance distribution in an effective available range and makes transformation of the image data.

Thus, by obtaining a luminance distribution of the image data in the unit of pixel, it is made possible to judge the so-called contrast width ranging from the highest luminance to the lowest luminance, and an enlargement ratio can be determined by comparison with the effective luminance range. Therefore, after that, all that is required is merely enlarging the luminance distribution so as to afford the enlargement ratio.

For enlarging the luminance distribution there may be adopted several methods insofar as the luminance distribution of image data is enlarged in an allowable range. In view of this point it is a further object of the present invention to provide a luminance distribution enlarging method and an example thereof.

In the image processing system according to the present invention, the image data luminance transforming means compares a statistical width of the luminance distribution detected with the width of the aforesaid luminance range and determines an enlargeable degree as the enlargement ratio. At the same time, the image data luminance transforming means determines an adjustment value to make adjustment so that the upper and lower ends of the thus-enlarged luminance distribution are within the luminance range in question, and modifies the luminance of each pixel. As an example, given that the range of a reproducible luminance is $y_{range}$, the luminance Y after transformation is obtained from the luminance y before transformation and a maximum value $y_{max}$ and a minimum value $y_{min}$ in the luminance distribution range in accordance with the following expression:

$$Y = ay + b \qquad (2)$$

$$a = y_{range}/(y_{max} - y_{min}) \qquad (3)$$

$$b = -a \cdot y_{min} \text{ or } y_{range} - a \cdot y_{max} \qquad (4)$$

In the above transformation expressions, $Y=0$ if $Y<0$ and $Y=y_{range}$ if $Y>y_{range}$.

According to the concept of the transforming method, both enlargement ratio and adjustment value are determined and the luminance of each pixel is modified on the basis of those values. An example is a linear enlargement. Although the transformation expression itself is the same as the conventional one, a significance resides in that the parameter thereof is selected by the image data luminance transforming means. Irrespective of the selection of b, $Y=0$ if $y=y_{min}$ and $Y=y_{range}$ if $y=y_{max}$. And the luminance distribution expands uniformly within the y range which is reproducible luminance range. The transformation in this example is a linear transformation in a narrow sense and no limitation is placed thereon. It is also possible to make a non-linear transformation in a broad sense. The transforming expression in question is merely one example and it goes without saying that even other transforming expression of the same meaning may also be employed.

According to the present invention thus constructed it is possible to enlarge the luminance distribution effectively within a predetermined range of gradation.

However, a mere expansion of contrast may sometimes be unable to cope with the case where the whole is bright or dark. It is therefore a further object of the present invention to adjust the whole brightness automatically.

In the image processing system according to the present invention, the image data luminance transforming means determines a maximum distribution luminance of the luminance y before transformation and executes γ correction to change the luminance distribution so that the range to which the maximum distribution luminance gives a desired brightness, thereby obtaining the luminance Y after transformation.

For judging whether image data is bright or not as a whole, the maximum distribution luminance of luminance y before transformation is utilized, and if the maximum distribution luminance is on the bright side, there is made γ correction to render the whole rather dark, while if the maximum distribution luminance is on the dark side, there is made γ correction to render the whole rather bright. In this way the entire brightness is corrected automatically, which cannot be attained by only the highlighting of contrast. It is optional whether the maximum distribution luminance of luminance y before transformation is to be obtained in terms of median or in terms of a mean value.

Thus, according to the present invention, the degree of brightness which cannot be adjusted by only the highlighting of contrast is also adjustable.

In transforming the luminance by any of various methods, it is also possible to first calculate and store the luminance Y after transformation within the range of the luminance y before transformation and then call up the correlation at the time of transformation. It is not impossible to calculate the luminance every time in accordance with transforming expressions, but the range of values which the luminance distribution can take has already been determined. Therefore, if the luminance Y after transformation is calculated and stored beforehand on the basis of the luminancey y before transformation, it becomes possible to effect transformation by merely calling up the correlation when the transformation is to be made.

When the luminance distribution of image data is reviewed statistically, it is proper to consider that the luminance distribution extends up to both-end positions in a reproducible luminance range although such a case is seldom encountered. It follows that both ends of an actual luminance distribution always correspond to both ends in a reproducible luminance range. If both ends in question are adopted, the enlargement ratio substantially becomes equal to "1" and it is impossible to attain the expected effect. It is therefore a further object of the present invention to obtain a substantial luminance distribution range which is enlargeable.

In the image processing system according to the present invention, the luminance distribution totaling means regards positions inside by a predetermined distribution ratio from the actual ends of a luminance distribution as end portions at the time of determining the above luminance distribution.

In the present invention thus constructed, by removing the predetermined distribution ratio at both ends, the skirt portion of an extremely reduced distribution is ignored moderately from the statistical point of view. Therefore, this range is used as a criterion in judging the degree of enlargement.

The predetermined distribution ratio is not specially limited if only it permits the skirt portion of an extremely reduced distribution to be ignored. For example, it may be the number of pixels corresponding to a certain ratio of the total number of pixels, or the positions where the distribution ratio is below a certain ratio may be regarded as end portions.

Thus, according to the present invention it is possible to obtain a luminance distribution more effective for judgment.

On the other hand, in an actual image there are both highlight portion and high-shadow portion, and the human eyes are easy to sense a delicate difference in these portions. Therefore, if an intentional enlargement reaching the end portions in a reproducible luminance range is performed, the highlight portion gives rise to a bald white impression, while the high-shadow portion affords a solid black impression.

It is therefore a further object of the present invention to provide an image processing system capable of improving the expressibility of such highlight and high-shadow portions.

In this image processing system, a luminance distribution range to be enlarged is set inside the end portions of the actual reproducible range by a predetermined amount. By so doing, an intentional enlargement is no longer performed at both end portions.

Thus, according to the present invention it is possible to prevent collapse of the highlight and high-shadow portions.

In some case a narrow contrast is inevitable. For example, in an evening scene it is natural that the luminance distribution width should be narrow. If it is enlarged to a greater extent than necessary, a daytime scene will result. It is therefore a further object of the present invention to provide an image processing system capable of preventing the impression of an image from being transformed to an unnatural degree.

In this image processing system, a limit is imposed on the enlarging degree of luminance distribution. By so doing, image data whose narrow contrast is inevitable is prevented from being enlarged its luminance distribution to an excessive degree. Needless to say, the above phenomenon is not limited to evening scenes but can be observed also in other cases. The occurrence of such a phenomenon is prevented by placing a limitation on the enlarging degree of luminance distribution.

Thus, according to the present invention it is possible to prevent excessive highlighting of contrast which would causes a change in atmosphere of the image concerned.

If a luminance distribution is used to the maximum extent within its reproducible range, there no longer remains a margin for enlargement of the luminance distribution. However, if a limit is imposed on the degree of enlargement, there remains a margin which permits enlargement of the luminance distribution. In other words, there remains freedom for selecting actual range to be used for the enlargement, and this selection may cause a change in atmosphere of image. It is therefore a further object of the present invention to provide an image processing system capable of automatically adjusting the margin which permits enlargement of a luminance distribution even when a limitation is placed on the degree of enlargement.

In this image processing system, a corresponding position of a luminance distribution range before transformation and that after transformation in a reproducible range are maintained to prevent the center of the luminance distribution from being changed.

The luminance distribution center of image in such a sense can be grasped in various ways. For example, the luminance distribution may be enlarged so that an enlargeable range ratio remaining at each of upper and lower ends of the luminance distribution range before transformation is retained also after transformation.

To be more specific, since it suffices if only the center is retained, it can be said unnecessary to directly catch and hold the center. Conversely, an enlargeable range remaining at each of upper and lower ends of the luminance distribution range before transformation is noted and the luminance distribution is enlarged so as to retain the ratio of that range also after transformation, thereby holding the center substantially.

As another example, it is preferable that the automatic judgment based on image data be applied to judging the degree of highlighting at the time of highlighting the vividness of a natural picture. It is therefore a further object of the present invention to provide an image processing system, an image processing method and a medium having an image processing control program recorded thereon, capable of adjusting the vividness automatically on the basis of image data.

This image processing system comprises a saturation distribution totaling means which inputs image data representing information of each of pixels resolved in a dot matrix form from an image and which then totals saturations of the pixels into a saturation distribution as a whole, a saturation transformation degree judging means for judging a saturation transformation degree of image data from the saturation distribution obtained by the saturation distribution totaling means, and an image data saturation transforming means which modifies saturation information contained in the image data on the basis of the transformation degree thus judged and transforms the modified information into a new image data.

The image processing method according to the present invention is for performing a predetermined image processing for image data which represents information of each of pixels resolved in a dot matrix form from an image. The method comprises totaling saturations of the pixels into a saturation distribution as a whole, then judging a saturation transformation degree for the image data from the saturation distribution thus obtained, then modifying saturation information contained in the image data on the basis of the transformation degree thus judged and transforming it into a new image data.

Further, the medium according to the present invention has an image processing control program recorded thereon for inputting to a computer image data which represents information of each of the pixels resolved in a dot matrix form from an image and for performing a predetermined image processing, the program comprising the steps of inputting the image data and totaling saturations of the pixels into a saturation distribution as a whole, judging a saturation transformation degree for the image data from the saturation distribution thus obtained, and modifying saturation information contained in the image data on the basis of the transformation degree thus judged and transforming it into a new image data.

In the present invention constructed as above, after the saturation distribution totaling means has totaled saturations of the pixels in the image data into a saturation distribution as a whole, the saturation transformation degree judging means judges a saturation transformation degree for the image data from the saturation distribution thus obtained, and the image data saturation transforming means transforms the image data in accordance with the transformation degree thus judged. That is, for each image, an optimum transformation degree is judged from a saturation distribution of image data and the image data is transformed on the basis thereof.

According to the present invention, therefore, it is possible to provide an image processing system wherein a saturation transformation best suited for each image can be done using a totaled saturation distribution.

In totaling saturations of pixels in image data into a saturation distribution, if the image data has saturation parameters, it suffices to total the parameters. Even in the case where the image data does not possess such parameters, it is possible, for example, to make a color transformation from another color specification space for a color specification space having such a saturation parameter and then total saturation parameters after the transformation. However, a considerable volume of processing is needed for the color transformation. It is therefore a further object of the present invention to total saturations without color transformation.

In the image processing system according to the present invention, the saturation of each pixel is judged in accordance with the saturation of a warm color hue in color components.

Although it is difficult to judge saturation without a change of color specification space, the human visual characteristic tends to regard the difference between a warm color hue and a non-warm color hue as being vivid, so it is relatively convenient to judge saturation on the basis of such difference.

Thus, according to the present invention it is possible to total saturations in accordance with the human visual characteristic.

In the image processing system according to the present invention, saturation (=X) is represented by the following expression, provided the color components of image data are red (R), green (G) and blue (B):

$$X = |G + B - 2 \times R| \qquad (5)$$

In the color specification space of RGB which is often used in a computer, there occurs a saturation-free state upon coincidence of the components and in the other cases there occurs saturation. In this connection, it is possible to judge the difference from the saturation-free state and thereby determine saturation, but the use of the relationship $|G+B-2 \times R|$ is preferred because the coincidence of the components affords a minimum value irrespective of component values, also because a maximum value is obtained in red and light blue monocolor and further because also in the case of blue or green there is presented a relatively large saturation. Needless to say, based on the same way of thinking, a like simplicity is attained by:

$$X' = |R + B - 2 \times G| \qquad (6)$$

$$X'' = |G + R - 2 \times B| \qquad (7)$$

Judging from experimental results, however, the best results are obtained by the expression (5). It can be said that this is supported by the human visual characteristic of recognizing vividness according to the saturation of a warm color hue.

According to the present invention, therefore, in the case of adopting the color specification of RGB, it is possible to decrease the calculation volume and total saturations in a simple manner.

Needless to say, as is the case with enlargement of luminance distribution, it is not always necessary that the saturation distribution in an image be obtained with respect to all the pixels of image data, insofar as it is possible to total saturations of pixels in image data into a saturation distribution. No special limitation is placed on a concrete totaling method.

In judging the degree of saturation transformation from the state of saturation distribution, there may be adopted any of various analyzing methods for analyzing the state of distribution concretely. Now, it is a further object of the present invention to give an example of a concrete analyzing method for the state of distribution.

In the image processing system according to the present invention, the saturation transformation degree judging means strengthens the degree of saturation highlighting in the case of a small saturation at a predetermined ratio from the upper end in the totaled saturation distribution, while when the said saturation is large, it weakens the saturation highlighting degree, thereby judging the degree of saturation transformation.

Thus, in judging the state of saturation distribution, a portion of the distribution is taken out from a large saturation side, then a judgment is made as to whether the saturation of that portion is large or small, and the entire saturation is detected from the result of the judgment, then the saturation is highlighted if it is small, while if the saturation is sufficiently large, it is judged that highlighting is not necessary. Needless to say, there may be adopted any other method, for example another statistical method, to judge the saturation tendency of the entire image data. Further, image data may be grasped partially, not wholly.

Thus, according to the present invention, judging the degree of saturation transformation at a predetermined ratio from the upper end in the totaled saturation distribution facilitates the judging.

There also are various other concrete methods for transforming the saturation of image data. For example, the transformation of saturation may be performed by radial displacement according to the foregoing degree of transformation within the Luv space in the standard calorimetric system.

To be more specific, if image data has a saturation parameter, this parameter may be transformed, but in the Luv space as the standard calorimetric system having a parameter of luminance or lightness and a parameter of hue in a plane coordinate system with respect to each luminance, the radial direction corresponds to saturation. In the Luv space, therefore, the transformation of saturation is performed by radial displacement.

The reason why the Luv space is adopted is that luminance is independent and that the displacement of saturation exerts no influence on luminance. In the case of using the Luv space, however, it is necessary to make transformation if there is no correspondence of the original image data thereto.

On the other hand, in the case where image data is expressed by equal hue components, as is often the case with image data, there may be adopted a method wherein components values exclusive of a non-saturation component are shifted according to the degree of transformation.

In the case where image data is represented by component values of plural, nearly equal hue components like RGB, it can be said that there is a saturation-free component. It follows that the component values exclusive of the saturation-free component exert an influence on saturation. In this case, saturation is transformed by displacing the component values.

As an example of coping with such saturation-free component there may be adopted a method wherein a minimum component value in plural hue components is subtracted from the other component values and the differential value thus obtained is increased or decreased to effect saturation transformation.

Of the plural color components, the minimum component value is also contained in the other color components, and such minimum component values are merely combined together and constitute a saturation-free gray. Thus, the differential value based on the other colors and exceeding the minimum component value exerts an influence on saturation, and by increasing or decreasing the differential value there is performed transformation of saturation.

According to another example, a corresponding value of luminance is subtracted from each component value and the differential value obtained is increased or decreased to perform the transformation of saturation. A mere displacement of component values exclusive of a saturation-free component will cause a change in luminance. For this reason, if a corresponding value of luminance is subtracted beforehand from each component value and the transformation of saturation is performed by increasing or decreasing the resulting differential value, it becomes possible to store luminance.

As to the luminance or lightness and the saturation are in a relation such that the color specification space assumes an inverted cone shape up to a certain range. It can be said that the lower the luminance, the larger the component values of hue. In such a case, if an attempt is made to apply a transformation degree proportional to a small value of saturation, there is a fear of breaking through the conical color specification space.

Therefore, when the luminance is low, the transformation degree of saturation may be weakened to prevent the occurrence of such inconvenience.

The transformation degree of saturation is judged by any of the foregoing various methods. However, if saturation is highlighted to a greater extent than necessary even when it is weak, there will not be obtained good results.

As to both saturation highlighting process and contrast enlarging process, there is a tendency to increase the value of image data. Therefore, if contrast is highlighted after highlighting of saturation, a loud image will result. This is not desirable.

However, since both processings are conducted each individually, one is first adjusted to an appropriate state and thereafter the other is adjusted, so it is unavoidable that the result of the previous adjustment will go wrong.

It is therefore a further object of the present invention to provide an image processing system, an image processing method and a medium having an image processing control program, capable of obtaining a desired image more easily.

The image processing system according to the present invention inputs image data which represents information of each of the pixels resolved in a dot matrix form from an image and then executes a predetermined image processing. The image processing system is provided with a contrast enlarging means for enlarging the luminance distribution in the image data, a saturation highlighting means for highlighting saturation in the image data, and a highlighting process suppressing means for suppressing the luminance distribution enlarging operation and the saturation highlighting operation with respect to each other.

The image processing method according to the present invention comprises inputting image data which represents information of each of pixels resolved in a dot matrix form from an image, enlarging the luminance distribution in the image data and highlighting saturation in the image data. The luminance distribution enlarging operation and the saturation highlighting operation are performed in a correlated manner so as to suppress each other.

Further, the medium according to the present invention has an image processing control program recorded therein, the said program comprising the steps of inputting image data which represents information of each of the pixels resolved in a dot matrix form from an image, enlarging the luminance distribution in the image data, highlighting saturation in the image data, and suppressing the luminance distribution enlarging operation and the saturation highlighting operation with respect to each other.

In the present invention thus constructed, the contrast enlarging means enlarges the luminance distribution in the image data, while the saturation highlighting means highlights the saturation of each pixel. In this connection, the highlighting process suppressing means suppresses the luminance distribution enlarging operation and the saturation highlighting operation with respect to each other.

Thus, when contrast is enlarged by the contrast enlarging means and saturation is highlighted by the saturation highlighting means, the highlighting process suppressing means suppresses both highlighting operations with respect to each other to prevent a synergistic effect of affording a loud image. Moreover, even if after one adjustment there is made the other adjustment, it is possible to keep the previous adjustment effective.

The highlighting process suppressing means is not specially limited if only it can suppress both luminance distribution enlarging operation and saturation highlighting operation with respect to each other. In this connection, the luminance distribution enlarging operation can be done by various methods and this is also true of the saturation highlighting operation. Therefore, concrete methods maybe selected suitably according to the contrast enlarging means and saturation highlighting means adopted. In suppressing both operations with respect to each other, it is not always necessary to suppress the two mutually. The suppressing method may be such that the suppressing process is applied from one to the other but is not applied from the other to one. By so doing, it becomes possible to make selection between the case where a synergistic highlighting is to be prevented and the case where it is allowed.

Needless to say, if the luminance distribution enlarging operation and the saturation highlighting operation can eventually be suppressed with respect to each other, this will do. For example, there may be adopted a method wherein when it is necessary to suppress the enlarging operation of the contrast enlarging means, the enlarging operation of the contrast enlarging means is not suppressed, but there may be performed a further transformation processing which denies the result of enlargement in the enlarged image data. It is also possible to obtain the same result by darkening the entire image though this is different from the enlargement of contrast. This can also be said of the saturation highlighting operation.

In connection with such a case, it is a further object of the present invention to provide a more concrete method for suppressing both highlighting operations with respect to each other.

In the image processing system according to the present invention, the highlighting process suppressing means sets a correlation so that when one of a parameter which represents the degree of luminance distribution enlargement in the contrast enlarging means and a parameter which represents the degree of saturation highlighting is large, the other is small.

In the present invention thus constructed, the contrast enlarging means transforms image data with use of the parameter which represents the degree of luminance distribution enlargement, and the saturation highlighting means also transforms image data with use of the parameter which represents the degree of saturation highlighting. Therefore, the correlation of one being large and the other small made by the highlighting process suppressing means eventually causes the luminance distribution enlarging operation and the saturation highlighting operation to suppress each other.

Thus, the correlation using the parameters representing the degree of contrast enlargement and the degree of saturation highlighting facilitates the processing in the present invention.

Various methods are available for correlating both parameters. For example, if one parameter is multiplied by a coefficient using the other parameter as denominator, the one parameter becomes smaller as the other parameter becomes larger. In this case, the other parameter is not influenced by the one parameter, but if it is desired that both be mutually influenced, this can be done easily by another method. Needless to say, there may be adopted a method wherein a transformation table to be referred to by both parameters and such transformation values as to suppress each other are read out.

Not only the above methods but also various other methods are available for the transformation of image data performed by the contrast enlarging means and the saturation highlighting means. To be concrete, the image data transforming operation may be done for each pixel. In the case where the image data transformation for contrast enlargement and the image data transformation for saturation highlighting are not performed for each pixel, a causal relation between both processing becomes complicated, and as the case may be it is required to conduct a complicated processing for suppressing the two with respect to each other, or a work area may be needed separately. In contrast therewith, the image data transforming operation performed for each pixel is advantageous in that the influence of the image data increasing or decreasing process on contrast and saturation becomes simple and hence the mutually suppressing process also becomes simple.

Also in setting the degree of highlighting, one or both of the contrast enlarging means and the saturation highlighting means may analyze image data and set the degree of highlighting. That is, the contrast enlarging means and the saturation highlighting means set the degree of highlighting automatically and in the course of this automation the highlighting process suppressing means performs the foregoing suppressing operation. Therefore, while the contrast enlarging means sets the degree of highlighting, if the degree of highlighting is weakened or a change is made from one processing to another by reference to, for example, the parameter in the saturation highlighting means, such a processing itself leads to constitution of the highlighting process suppressing means. Needless to say, in the case where the degree of highlighting is weakened or a change is made from one processing to another by reference to, for example, the parameter in the contrast enlarging means, such a processing itself leads to constitution of the highlighting process suppressing means.

It goes without saying that not only for judging whether the image concerned is a natural picture or not on the basis of the number of colors but also for judging whether the image concerned is to be subjected to image processing or not, there may be adopted other methods.

For example, there may be adopted a method wherein a binary image data, such as monochrome image data, is determined on the basis of a luminance distribution and, if the image data concerned is a binary image data, the enlargement of luminance distribution and highlighting of saturation may be omitted.

As to a binary image, there is no luminance distribution in a substantial sense nor is saturation, so once a binary image data is determined from a luminance distribution, there is performed neither enlargement of luminance distribution nor highlighting of saturation. Further, since it is possible that a binary image data will have a certain color, there can be two luminances corresponding respectively to the presence and absence of that color. It is possible to judge whether a luminance is of that color or not, but when there is no suggestive information, it may be judged that the image data concerned is a binary black-and-white image data when the luminance distribution is concentrated on both ends in a reproducible range. That is, in the case of a black-and-white image, it can be said that the luminance distribution is concentrated on both ends in the reproducible range, thus permitting judgment.

It is the formation of a frame that can occur frequently in image processing. It is not necessary to apply any image processing to the frame. It is therefore a further object of the present invention to provide an image processing system, an image processing method, and a medium having an image processing control program recorded thereon, capable of performing an image processing most suitable to image data having a frame.

The image processing system according to the present invention inputs image data which represents information of each of pixels resolved in a dot matrix form from an image and then executes a predetermined image processing. The image processing system is provided with a frame discriminating means which, on the basis of the image data, judges a portion including an extremely large number of certain pixels to be a frame portion, and an image data excluding means which excludes from the image processing the image data of pixels having been judged to be a frame portion.

In the image processing method according to the present invention, a predetermined image processing is performed for image data which represents information of each of pixels resolved in a dot matrix form from an image. According to the same method, if a portion of the image data includes an extremely large number of certain pixels, it is judged to be a frame portion, and the image data of the pixels having been judged to be a frame portion is not subjected to the image processing.

Further, the medium according to the present invention has an image processing control program recorded thereon for inputting image data which represent information of each of the pixels resolved in a dot matrix form from an image and performing a predetermined image processing, which program comprises the steps of judging, on the basis of the image data, a portion to be a frame portion if an extremely large number of certain pixels are included therein, and excluding from the image processing the image data of the pixels having been judged to be a frame portion.

In the present invention thus constructed, the frame discriminating means judges, on the basis of the image data, a portion of the image data to be a frame portion if an extremely large number of pixels are included therein, and the image data excluding means excludes from the image processing the image data of the pixels having been judged to be a frame portion.

That an image possesses a frame occurs frequently. The pixels which constitute a frame are almost the same pixels and the number thereof is extremely large as compared with the number of the other pixels. Therefore, if they are included in an extremely large number in a certain portion of the image data, this portion is judged to be a frame portion and is not subjected to the image processing.

The frame which occurs in the image data is black or white in many cases. It is therefore a further object of the present invention to provide an image processing system capable of excluding such a black or white frame efficiently. In the image processing system according to the present invention, the frame discriminating means regards pixels which take both-end values in an effective range of the image data as a candidate for a frame portion.

Needless to say, the color of frame is not limited to black and white. It is a further object of the present invention to exclude even other frames than black and white frames.

In the image processing system according to the present invention, the frame determining means totals luminances of the pixels into a luminance distribution as a whole when the image data is a natural picture and regards a prominent luminance portion in the luminance distribution as a candidate for a frame portion.

If such a prominent luminance portion exists as a monocolor frame, only the luminance portion corresponding to that color projects. Therefore, a prominent luminance portion, if any, is judged to be a frame portion of image data, and once a frame portion is detected, the data of the frame portion need not be used in the enlargement of luminance distribution and highlighting of saturation. More particularly, if a prominent luminance portion is used as a criterion in the luminance enlargement, an effective judgment may no longer be feasible, so such a portion is judged to be a frame portion and is not used in the enlargement of luminance distribution.

As an example, the luminance portions concentrated on both ends in a reproducible range may be judged to be a white or black frame portion. A white or black frame is often detected and adopted and can also result from trimming. It corresponds to an end portion in a reproducible range. Therefore, the luminance portion concentrated on the end portion is judged to be a frame portion.

As an example of judging whether the image data is of a natural picture or not, there may be used a natural picture discriminating means which judges the image data to be not of a natural picture when the luminance distribution exists in the shape of a linear spectrum. It can be said that a natural picture is characterized by a smooth width of its luminance distribution. In most cases, therefore, if the luminance distribution is in the shape of a linear spectrum, one can judge that the image data is not of a natural picture.

In some case the image processing system is used alone, and in another case it may be incorporated in a certain apparatus.

Thus, the idea of the invention is not restricted to only a limited case, but covers various modes. A change may be made as necessary, for example, between software and hardware.

As an example, the image processing system in question may be applied to a printer driver in which inputted image data is transformed into image data corresponding to the printing ink used and the thus-transformed image data is printed using a predetermined color printer.

Thus, the printer driver transforms the inputted image data correspondingly to the printing ink used, and at this time the foregoing processing may be carried out for the image data. In the case where a materialized example of the idea of the invention takes the form of software in the image processing system, such a software is inevitably present and utilized also on the recording medium used in the system. It is therefore a further object of the present invention to provide not only the foregoing image processing system and method but also a medium having an image processing control program recorded thereon which program substantially controls the image processing system and method.

Needless to say, the recording medium maybe a magnetic recording medium or a magneto-optic recording medium, or any other recording medium which will be developed in the future. Just the same way of thinking is applicable also to duplicate products, including primary and secondary duplicate products. The present invention is applicable also to the case where a communication line is utilized as a software supply line. In this case, the software supply side using the communication line functions as a software supply system and thus the present invention is also utilized here.

Further, even a construction including software as a portion and hardware as another portion is by no means different from the concept of the present invention. There may be adopted a construction wherein image data are partially recorded on a recording medium and are read as necessary. It goes without saying that the invention is applicable also to such image processing systems as color facsimile machine, color copying machine, color scanner, digital still camera and digital video camera.

BRIEF DESCRIPTION OF THE DRAWINGS

FIG. 2 is a block diagram showing processing performed in the interior of a computer;

FIG. 3 is a schematic block diagram showing a more detailed configuration of an image processing means;

FIG. 4 is a schematic block diagram showing a more detailed configuration of a printer driver;

FIGS. 11(a)–(c) are diagrams showing a relation between an image before transformation and a sampling image;

FIG. 12 is a flowchart showing a luminance distribution sampling and processing portion in the image processing system;

FIG. 13 is a flowchart showing a luminance transformation processing portion in the image processing system;

FIG. 14 is a diagram showing a black-and-white image;

FIG. 15 is a diagram showing a luminance distribution of the black-and-white image;

FIG. 16 is a diagram showing an image having a frame portion;

FIG. 17 is a diagram showing a luminance distribution of the framed image;

FIG. 18 is a diagram showing processing for end portions of a luminance distribution;

FIG. 19 is a diagram showing enlargement of a luminance distribution and a reproducible luminance range;

FIG. 20 is a diagram showing limitation of a luminance distribution enlarging ratio;

FIG. 21 is a diagram showing a transformation table for use in enlarging a luminance distribution;

FIG. 22 is a diagram showing a brightening concept by γ correction;

FIG. 23 is a diagram showing a darkening concept by γ correction;

FIG. 32 is a flowchart showing an outline of a contrast enlarging process;

FIG. 33 is a flowchart showing an outline of a saturation highlighting process;

FIGS. 37(A) and (B) are diagrams showing an application concept of a highlighting suppressing concept applied using a transformation table in a further modified embodiment according to the invention;

FIGS. 38(A) and (B) are diagrams showing an application concept of a highlighting suppressing process using a non-interference area;

FIG. 40 is a diagram showing an unsharp mask;

FIG. 41 is a diagram showing an improved unsharp mask;

FIG. 42 is a diagram showing directions for comparison with adjacent pixels in image data;

FIGS. 45(A)–(C) and diagrams showing a concept of 8-point interpolating calculation;

FIG. 46 is a diagram showing the contents of a cache table;

FIG. 47 is a flowchart of a pre-gray level transforming process; and

FIG. 48 is a diagram showing in what manner an error is diffused in each pixel.

DESCRIPTION OF THE PREFERRED EMBODIMENTS

Embodiments of the present invention will be described hereinunder with reference to the accompanying drawings.

Figure 1:
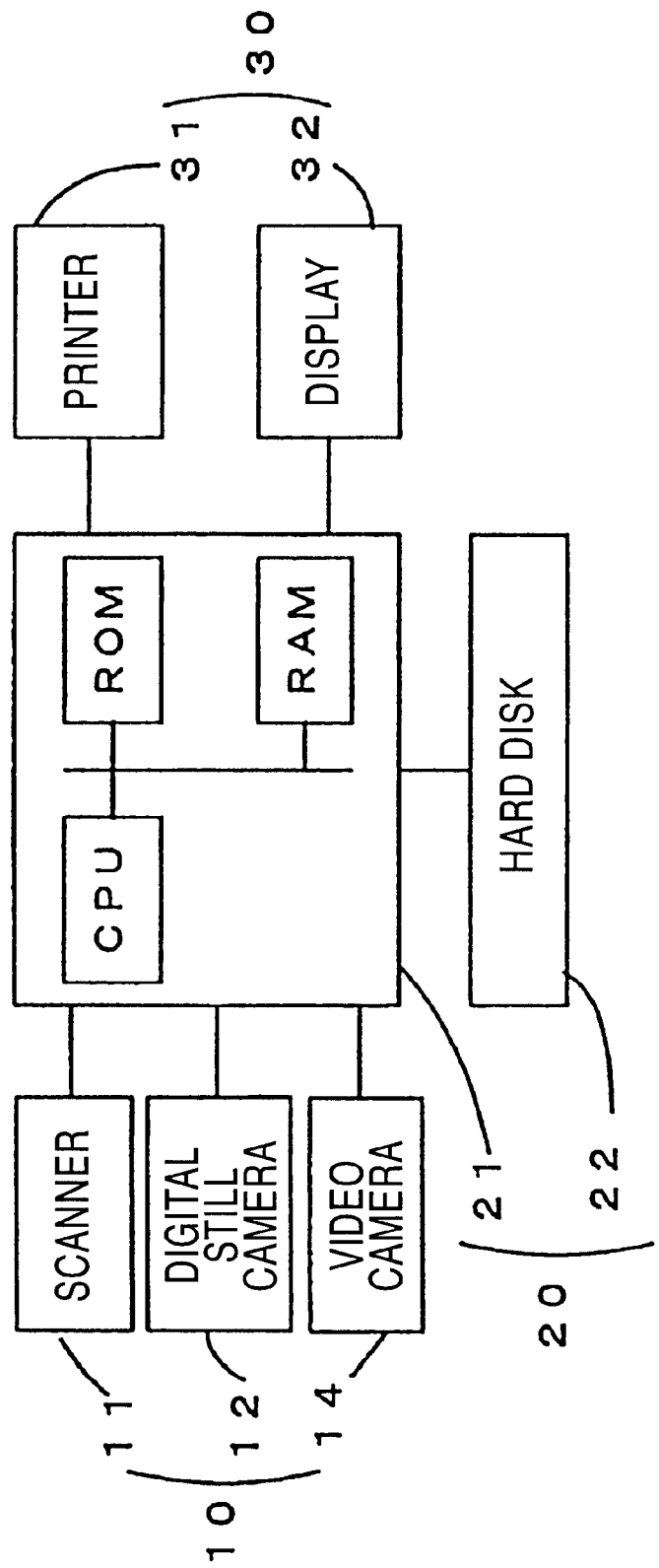
FIG. 1 is a block diagram showing a concrete hardware configuration example of an image processing system according to an embodiment of the present invention.

FIG. 1 shows as a block diagram a concrete hardware configuration example of an image processing system according to an embodiment of the present invention.

In the figure, a scanner 11, a digital still camera 12 and a video camera 14 are provided as image input devices 10. A computer body 21 and a hard disk 22 are provided as image processors 20 which play main roles in image processing including image discrimination. Further, a printer 31 and a display 32 are provided as image output devices 30 for the display and output of images after image processing.

In the interior of the computer body 21 there is performed processing as shown in FIG. 2. As shown in the same figure, an operating system 21a operates in the interior of the computer body 21, and a printer driver 21b and a video driver 21c are incorporated therein correspondingly to the printer 31 and the display 32, respectively. On the other hand, an application 21d is controlled in its execution of processing by the operating system 21a, and where required, it cooperates with the printer driver 21b and the video driver 21c to execute a predetermined image processing.

In this embodiment, the scanner 11 and the digital still camera 12 as image input devices 10 output gradation data of RGB (red, green, blue) as image data. As the image output devices 30, the printer 31 requires CMY (cyan, magenta, yellow) or CMYK (CMY+black) as an input of binary calorimetric data, and the display 32 requires gradation data of RGB as an input. Therefore, a concrete role of the computer body 21 as an image processor 20 is to input gradation data of RGB, prepare gradation data of RGB having been subjected to a necessary highlighting process, and cause it to be displayed on the display 32 through the video driver 21c or cause it to be printed by the printer 31 after transformation into binary data of CMY through the printer driver 21b.

According to the image processing performed in this embodiment, upon input of image data into the computer body 21, a number-of-color detecting means 21d1 in the application 21d detects the number of colors used in the inputted image data, then an image discriminating means 21d2 judges the type of image, and an image processing means 21d3 performs an appropriate image processing automatically which processing is set beforehand according to the type of image. The image data after the image processing is displayed on the display 32 through the video driver 21c and, after confirmation, are transformed into printing data by the printer driver 21b, which is printed by the printer 31.

In this embodiment, for the image processing means 21d3 which is set according to the type of image, there are provided a contrast enlarging process, a saturation highlighting process and an edge highlighting process, as shown in FIG. 3. In the printer driver 21b which transforms image data into printing data, as shown in FIG. 4, there are provided a rasterizer 21b1 for rasterizing the printing data, a color transforming section 21b2 which performs color transformation by pre-gray level transformation or by a combination of cache and interpolating calculation, and a gray level transforming section 2b3 which performs a binary coding process for gradation data after the color transformation.

Although in this embodiment a computer system is interposed between the image input and output devices to perform the image processing, such a computer system is not always needed.

Figure 5:
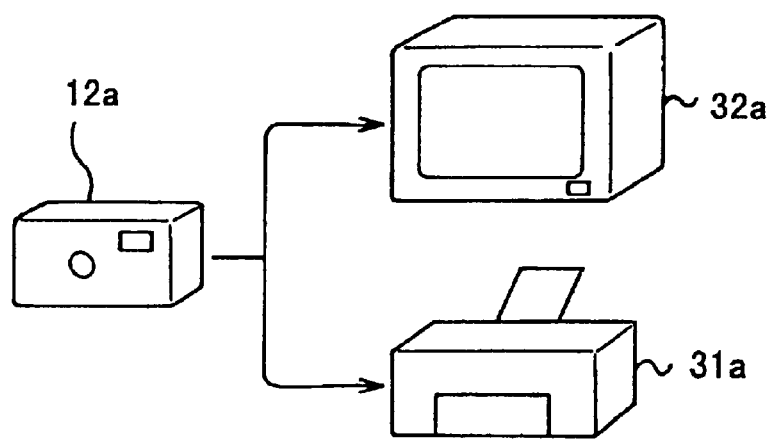
FIG. 5 is a schematic block diagram showing another application example of the image processing system.
Figure 6:
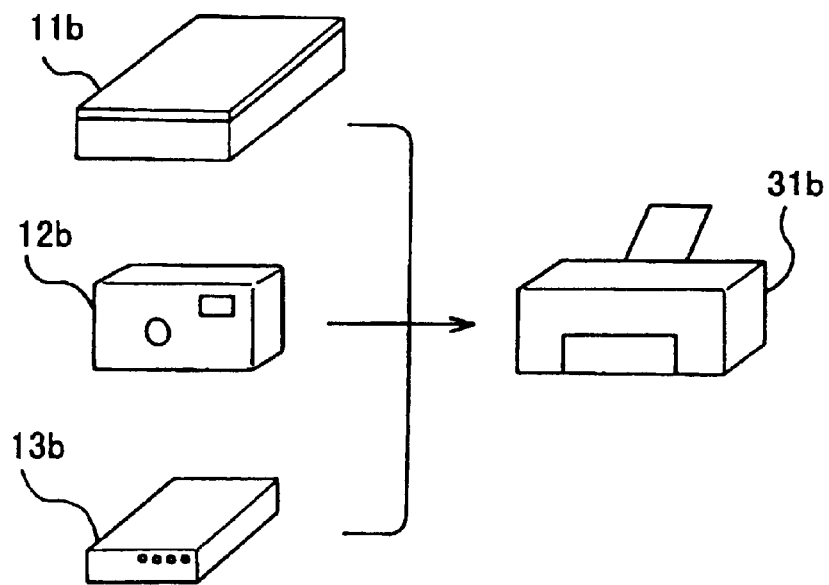
FIG. 6 is a schematic block diagram showing a further application example of the image processing system.

There may be adopted such a system configuration as shown in FIG. 5 wherein image processors are mounted for highlighting contrast within the digital still camera 12a, and image data after transformation is displayed on a display 32a or printed by a printer 31a. As shown in FIG. 6, in the case of a printer 31b which inputs and prints image data without going through a computer system, it is possible to construct the printer so that image data inputted through a scanner 11b, a digital still camera 12b, or a modem 13b, is highlighted in its contrast automatically.

Figure 7:
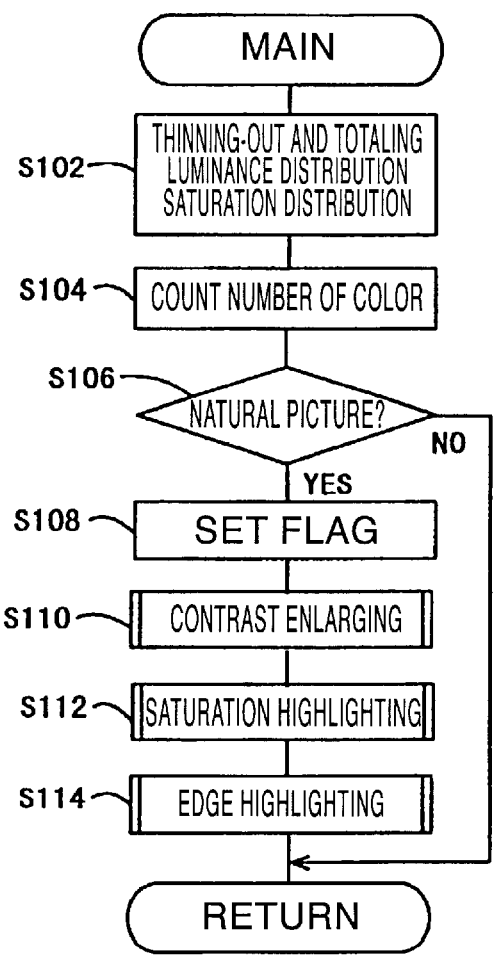
FIG. 7 is a flowchart showing an image processing in an application according to the present invention.

FIG. 7 is a flowchart corresponding to the image processing application. In steps S102 and S104, luminances are totaled into a luminance distribution and the number of colors used is detected.

Reference will first be made below to the luminance distribution detecting process.

Figure 8:
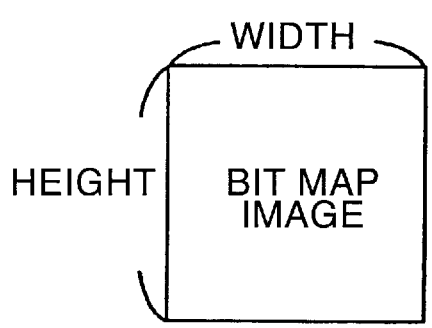
FIG. 8 is a diagram showing an image before transformation.

Before explaining in what manner luminance is to be represented, description will be directed to pixels to be totaled into a luminance distribution. As in step S102 shown in FIG. 7, there is performed processing for thinning out pixels concerned. As shown in FIG. 8, if the inputted image is a bit map image, it is formed in a two-dimensional dot matrix shape comprising a predetermined number of dots in the longitudinal direction and a predetermined number of dots in the lateral direction. For obtaining an accurate luminance distribution it is necessary to check luminance with respect to all the pixels. However, the distribution detecting process in question aims at detecting the number of colors used indirectly from luminance, so it is not always required to be accurate. Therefore, it is possible to effect thinning-out of pixels within a certain range of error. According to a statistical error, an error relative to the number of samples N is expressed generally as $1/(N^{}(1/2))$ where  stands for a power. Accordingly, for carrying out the processing with an error of 1% or so, N is equal to 10000.

In this connection, the bit map screen shown in FIG. 8 includes (width)×(height) number of pixels, and a sampling cycle ratio is assumed to be as follows:

$$\text{Ratio} = \min(\text{width}, \text{height})/A + 1 \quad (8)$$

Figure 9:
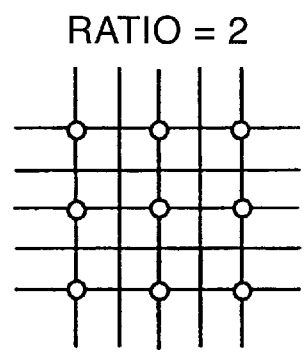
FIG. 9 is a diagram showing a sampling cycle.
Figure 10:
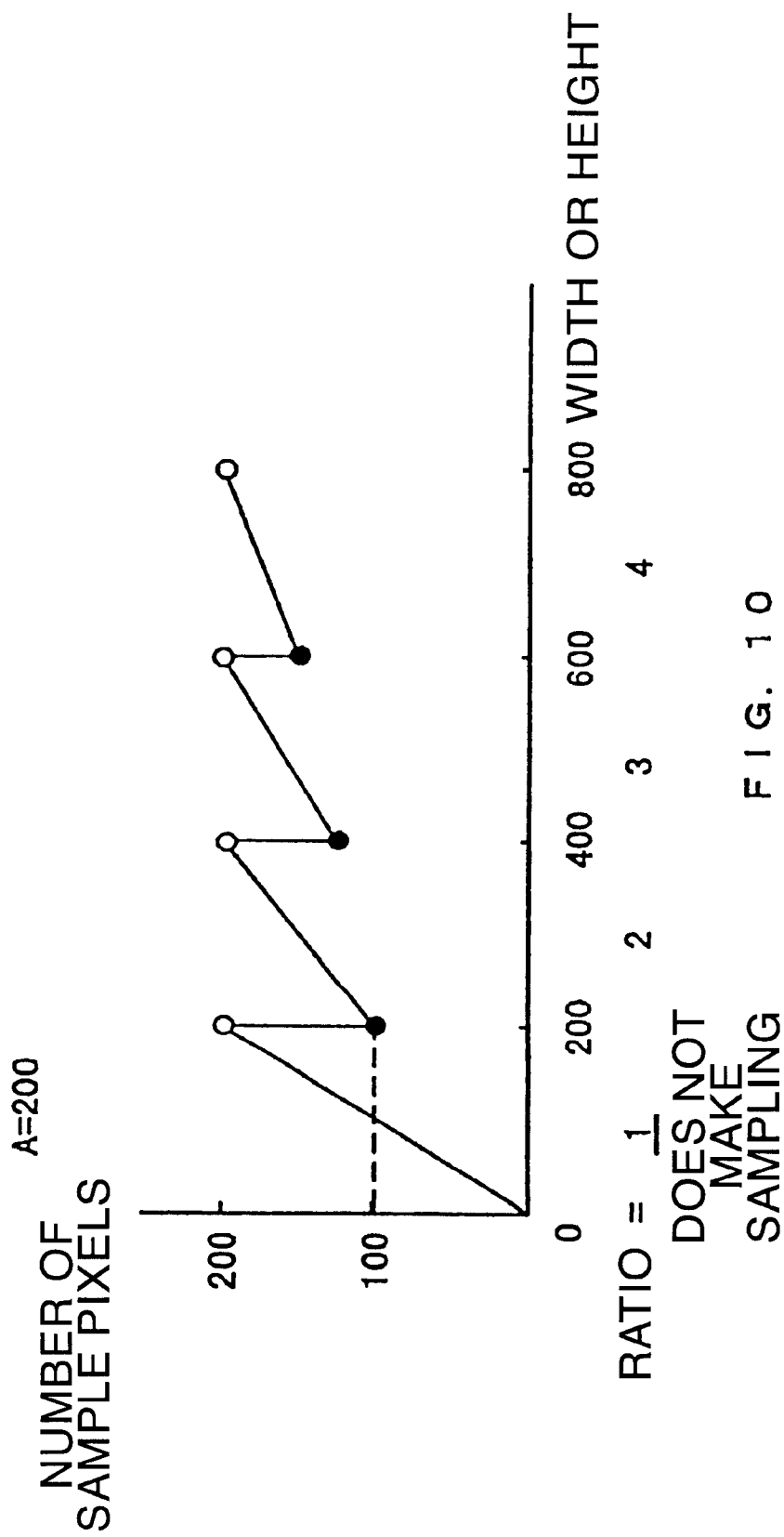
FIG. 10 is a diagram showing the number of sampling pixels.

In the above expression, min (width, height) indicates the smaller one of width and height, and A is a constant. Further, the sampling cycle ratio indicates the number of pixel at which sampling is performed. The ○-marked pixels in FIG. 9 represents a sampling cycle ratio=2. That is, sampling of one pixel is performed at every two pixels in the longitudinal and lateral directions. Thus, sampling is performed at every other pixel. Given that A is equal to 200, the number of sampling pixels in one line is as shown in FIG. 10.

As is seen from the same figure, the number of samples is at least 100 pixels or more when there is a width of 200 pixels or more, except the sampling cycle ratio=1 at which sampling is not conducted. Therefore, in the case of 200 pixels or more in the longitudinal and lateral directions, there is ensured (100 pixels)×(100 pixels)=(10000 pixels) and error can be kept to 1% or less.

The sampling cycle ratio is based on min(width, height) for the following reason. If width>>height as in the bit map image shown in FIG. 11(a) if the sampling cycle ratio is determined on the basis of the longer width, there may occur a phenomenon such that pixels are sampled longitudinally in only two upper- and lower-end lines as in FIG. 11(b). However, if the sampling cycle ratio is determined on the basis of the smaller one of width and height, it becomes possible to effect thinning-out of pixels so as to include an intermediate portion also in the longitudinal direction of the smaller one as in FIG. 11(c).

In this example the thinning-out of pixels is performed at an accurate sampling cycle for pixels in both longitudinal and lateral directions. This is suitable for the case where successively inputted pixels are processed while they are thinned out. However, in the case where all the pixels have been inputted, coordinates may be designated randomly in the longitudinal or lateral direction to select pixels. By so doing, when a minimum required number of pixels, say 10000 pixels, have been determined, the sampling process may be repeated randomly up to 10000 pixels and be stopped when the 10000 pixels have been sampled.

If the image data of the thus-selected pixels has luminances as constituent elements, a luminance distribution can be obtained using the luminance values. On the other hand, even in the case of image data wherein luminance values are not direct component values, it is indirectly provided with component values indicative of luminance. Therefore, if transformation is made from a color specification space wherein luminance values are not direct component values to a color specification space wherein luminance values are direct component values, it is possible to obtain luminance values.

It is not that the color transformation between different color specification spaces is determined in a unitary manner, but it is required to first determine a correlation of color spaces including component values as coordinates and then perform transformation successively while making reference to a color transformation table with the correlation stored therein. Because of the table, component values are represented as gray scale values, and in the case of 256 gray scales having three-dimensional coordinate axes, the color transformation table must cover about 16,700,000 (256× 256×256) elements. In view of an effective utilization of the memory resource, correlations are prepared usually with respect to sporadic lattice points, not all the coordinate values, and an interpolating calculation is utilized. Since this interpolating calculation is feasible through several multiplications and additions, the calculation volume becomes vast.

More particularly, if a color transformation table of full size is used, the processing volume becomes smaller, but the table size poses an unreal problem, and if the table size is set at a real size, the calculation volume becomes unreal in many cases.

In this embodiment, in view of such circumstances, there is adopted the following transforming expression which determines luminance from the three primary colors of RGB. More specifically, as to the luminance yp at point P, it is set as follows on the basis of component values (Rp,Gp,Bp) of RGB:

$$yp=0.30Rp+0.59Gp+0.11Bp \qquad (9)$$

Using this expression, a luminance value can be obtained by only three multiplications and two additions.

In this embodiment there is adopted such a transforming expression because the color specification space of RGB is used, but at the background thereof there exists a nature such that each component value represents the brightness of color and therefore, when viewed each independently, corresponds to linearly to luminance. More roughly speaking, therefore, it is not impossible to simplify as follows without considering each addition ratio:

$$yp=(Rp+Gp+Bp)/3 \qquad (10)$$

After luminances have been totaled by such a thinning-out process, the number of luminance values not "0" in the number of pixels is counted in step S104, whereby the number of colors used can be detected. Although in step S102 not only luminance values but also saturation values are totaled to detect a distribution thereof, this totaling process will be described later.

Once the number of colors used is detected in this way, a comparison is made in step S106 between the detected number of colors and a predetermined threshold value, and if the number of colors used is larger, it is judged that the image data in question is of a natural picture. For example, the threshold value may be set at "50" colors. As other examples of image data other than natural pictures' there are business graphs and drawing type images, which are read using the scanner 11. In some cases, a computer graphic image is read through the scanner 11 or is input from a network through the modem 13b.

In the case of a natural picture, a related flag is set in step S108. The reason why the flag is set is that it is intended to transmit the result of judgment also to the printer driver 21b in an operation other than the image processing in the application 21d. Although in this embodiment there is provided only one threshold value to judge whether the image data concerned is of a natural picture or not, there may be performed a more detailed judgment in the range corresponding to the number of colors used. For example, even in the case of a computer graphic image, the number of colors sometimes becomes larger depending on gradation or may become larger due to a blunt edge portion at the time of readings by the scanner 11 despite the actual number of colors being not so large. In this case there may be adopted a method wherein such image data are classified between natural and unnatural pictures and there is conducted only an edge highlighting process even without conducting the image processing for natural pictures as will be described later.

As to a natural picture, contrast is enlarged in step S110, saturation is highlighted in step S112, and edge is highlighted in step S114.

The contrast enlarging process is shown in FIGS. 12 and 13 in terms of flowcharts. As shown in the same figures, the following points should be taken into consideration before obtaining a luminance distribution of the pixels selected by the above thinning-out processing.

One point relates to the case where the image concerned is a binary image such as a black-and-white image. In the case of a binary image, including a black-and-white image, the concept of highlighting contrast is inappropriate. In such a black-and-white image as shown in FIG. 14, a luminance distribution of this image concentrates on both ends in a reproducible range, as shown in FIG. 15. Basically, it concentrates on the gray scales "0" and "255."

Therefore, the judgment in step S124 as to whether the inputted image is a black-and-white image or not can be done on the basis of whether the sum of pixels at gray scales of "0" and "255" is coincident or not with the number of the pixels thinned out and selected. If the image is a black-and-white image, the processing flow shifts to step S126 in which an unenlarging process is executed to stop the processing without going through the processing described below. In this embodiment, the distribution sampling process and the luminance transforming process are broadly classified, and in this unenlarging process a flag is raised so as not to execute the latter stage of luminance transforming process, thereby bringing this distribution sampling process to an end.

Binary data is not limited to black and white, but there can be even colored binary data. Also in this case it is not necessary to carry out the contrast highlighting process. If a check of the state of distribution shows that distribution is concentrated on only two values (one is usually "0"), the data concerned is regarded as a binary data and the processing may be interrupted.

The second point to be taken into account is whether the inputted image is a natural picture or not. This judgment can be done on the basis of the flag set in step S108. If the number of colors is small, the luminance distribution is sparse, and in the case of a business graph or the like, it is represented in the form of a linear spectrum. Whether the distribution is in the form of a linear spectrum or not can be judged in terms of an adjacent ratio of luminance values which are not "0" in the number thereof distributed. To be more specific, a judgment is made as to whether there is a distribution number in adjacent luminance values which are not "0" in the number thereof distributed. In terms of the distribution number, if at least one of two adjacent luminance values is in an adjacent state, there is done nothing, while if neither is in an adjacent state, counting is performed. As a result, judgment may be made on the basis of the ratio between the number of luminance values which are not "0" and the counted value. For example, if the number of luminance values not "0" is 50 and that of those not in an adjacent state is 50, it is seen that the luminance distribution is in the form of a linear spectrum.

In the case where the image processing program is executed through the operating system, the judgment as to whether the inputted image is a natural picture or not can be made using an image file extender. In the bit map file, particularly for photographic images, the file is compressed and there often is used an implicit extender for representing the compressing method. For example, the extender "JPG" shows that the compression is made in JPEG format. Since the operating system manages the file name, if an inquiry is issued from the printer driver side for example to the operating system, the extender of the file is replied, so there may be adopted a procedure of judging the image concerned to be a natural picture on the basis of that extender and then highlighting the contrast. In the case of an extender peculiar to a business graph such as "XLS," it is possible to determine that contrast highlighting is not performed.

The third point to be taken into account is whether the marginal portion of the image is framed as in FIG. 16. If the frame portion is white or black, it influences the luminance distribution and a linear spectral shape appears at each end in a reproducible range as in FIG. 17. At the same time, a smooth luminance distribution also appears inside both ends correspondingly to the interior natural picture.

Needless to say, since it is more appropriate not to consider the frame portion in the luminance distribution, a judgment is made as to whether the sum of pixels at the gray scales "0" and "255" is sufficiently large and coincides with the number of pixels which have been thinned out and selected. If the answer is affirmative, it is judged that there is a frame portion, and in step S132 there is performed a frame processing. In this frame processing, the number of pixels in the gray scales of "0" and "255" in the luminance distribution is set to "0" in order to ignore the frame portion. By so doing, the processing which follows can be done on the assumption that there is no frame portion.

Although the frame portion being considered in this example is white or black, there sometimes is a frame of a specific color. In this case, there appears a linear spectral shape projecting from the original smooth curve of the luminance distribution. Therefore, as to a linear spectral shape which causes a great difference between adjacent luminance values, it is considered to be a frame portion and not considered in the luminance distribution. Since it is possible that the said color may be used in the other portion than the frame portion, there may be allocated a mean of both adjacent luminance values.

After the above considerations, if the luminance distribution is to be enlarged, there are obtained both ends of the distribution in step S136.

In the case of a natural picture, its luminance distribution appears generally in a chevron shape, as shown in FIG. 18, provided various positions and shapes can appear. The width of the luminance distribution depends on the positions of both ends of the distribution. However, mere extended skirt positions corresponding to the distribution number of "0" cannot be set at both ends. This is because in the skirt portions the distribution number shifts in the vicinity of "0" and when viewed statistically there occurs an unlimited change which approaches "0."

For this reason, portions located respectively inside the highest luminance side and the lowest luminance side in the distribution range by a certain distribution ratio are regarded as both ends. In this embodiment the said distribution ratio is set at 0.5%, as shown in FIG. 18. Needless to say, this ratio may be changed as necessary. By thus cutting off both upper and lower ends by only a certain ratio it becomes possible to ignore white or black spots caused by noise for example. Without this processing, even one white or black spot would form both ends in the luminance distribution, so that in many cases the bottom and top ends correspond to "0" and "255" in gray scale. But this does not occur if the portion located inside the top end by 0.5% pixels is made an end portion.

In the actual processing, there is calculated 0.5% of the pixel to be processed (the total number of pixels selected by thinning-out or the total number of pixels obtained by removing the pixels corresponding to the frame portion), then the respective distribution numbers are totaled successively toward the inside from the upper- and the lower-end luminance values in the reproducible luminance distribution, and there is determined a luminance value corresponding to 0.5%. These upper end side and lower end side will hereinafter be referred to as $y_{max}$ and $y_{min}$, respectively.

Although in this embodiment both upper and lower ends are determined through such a processing for the luminance distribution, it is also possible to determine both ends by a statistical processing. For example, there may be adopted a method wherein a portion of a certain percent relative to a mean value of luminance values is regarded as an end portion.

The above processing corresponds to the distribution detecting processing. Next, a description will be given of a luminance transforming process which performs the transformation of image data on the basis of the luminance values $y_{max}$ and $y_{min}$ thus obtained. If an unenlarging process is executed in step S126, this is detected by reference to a predetermined flag in step S142 and the image processing is ended without performing the processings which follow. A basic transformation of luminance is performed in the following manner. Given that the reproducible luminance range is 0 to 255, the luminance Y after transformation is determined from the luminance y before transformation and the maximum value $y_{max}$ and the minimum value $y_{min}$ in the luminance distribution range in accordance with the following expression:

$$Y = ay + b \quad (2)$$

$$\text{where, } a = 255/(y_{max} - y_{min}) \quad (3)$$

$$b = a \cdot y_{min} \text{ or } 255 - a \cdot y_{max} \quad (4)$$

In the above transforming expression, if Y<0, Y=0, and if Y>255, Y=255. In the same expression it can be said that a stands for inclination and b offset. According to this transforming expression, a luminance distribution having a certain narrow width can be widened up to a reproducible range, as shown in FIG. 19. Basically in the enlargement of a luminance distribution range, the original and enlarged ranges coincide with each other in the area of histogram because the number of pixels does not change.

When a luminance distribution is enlarged by making the most of the reproducible range, there sometimes occurs a bald white impression of a highlight portion or a solid black impression of a high-shadow portion. To avoid this, the reproducible range is limited in this embodiment. More particularly, there remains an unenlarged area of 5 in terms of a luminance value from each of the upper and lower ends in the reproducible range. As a result, the parameters in the transformation expression become as follows:

$$a = 245/(y_{max} - y_{min}) \quad (11)$$

$$b = 5 - a \cdot y_{min} \text{ or } 250 - a \cdot y_{max} \quad (12)$$

In this case, transformation is not performed in the ranges of $y < y_{min}$ and $y > y_{max}$.

Thus, the area of 5 in terms of a luminance value from each end portion is set as an unenlarged area for retaining both highlight portion and high-shadow portion. However, if an image output device used permits both highlight portion and high-shadow portion to be reproduced relatively easily, the above area may be narrowed, or in the case where the reproducing power is weaker, the above area may be widened. It is not always required to stop the enlargement completely. The enlargement ratio may be gradually limited at the border region.

FIG. 20(a) shows a narrow luminance distribution of an image. If the enlargement ratio of luminance distribution (corresponding to a) is applied in the manner described above, there sometimes is obtained a very large enlargement ratio in proportion to a reproducible range. In this case, although it is natural that the contrast width form the brightest portion to the darkest portion should be narrow in a dusk state, for example at nightfall, an attempt to enlarge the image contrast to a great extent may result in transformation into an image as if the image were a daytime image. Since such a transformation is not desired, a limit is placed on the enlargement ratio so that the parameter a does not exceed 1.5 (~2). By so doing, a dusk state is expressed as such.

When no limitation is placed on the enlargement ratio, the result is as indicated with a dot-dash line in FIG. 20(a). As shown in the same figure, there remains no extra portion in the reproducible range after transformation. However, in the case where the enlargement range is restricted, as shown by two-dots-dash line in FIG. 20(b), there occurs freedom as to where the distribution after transformation should be. In some case the whole may be too bright or too dark.

In this embodiment, therefore, transformation is made in such a manner that the ratio of areas (m1:m2) remaining on the upper end side and the lower end side in the reproducible range of a luminance distribution before transformation coincides with the ratio of areas (n1:n2) remaining on the upper and lower end sides after transformation. In this case, the parameter b is determined in the following manner.

In the luminance distribution of image before transformation m1=$y_{min}$ m2=255−$y_{max}$ Now, m1+m2=255−(y max−y min). Therefore, if ydif=y max−ymin, m1+m2=255−ydif In the luminance distribution of image before transformation, m1=$y_{min}$ m2=255−$y_{max}$ Now, m1+m2=255−($y_{max}$−$y_{min}$). Therefore, if $y_{dif}$=$y_{max}$−$y_{min}$, m1+m2=255−$y_{dif}$ In the luminance distribution of image after transformation, n1=$Y_{min}$ n2=255−$Y_{max}$ Likewise, $$n1 + n2 = 255 - Y_{max} - Y_{min}$$
$$= 255 - a(y_{max} - y_{min})$$
$$= 255 - a \cdot y_{dif}$$

n1+n2=255−(Y max−Y min)
=255−a(y max−y min)
=255−a·ydif

Since m1:m2=n1:n2, n1=m1(n1+n2)/(m1+m2)

=$y_{min}$(255−a·$Y_{dif}$)/(255−$Y_{dif}$)

On the other hand, since Y=ay+b, b=Y−ay, and hence $$b=Y_{min}-a \cdot y_{min}=Y_{min}\{(255-a \cdot y_{dif})/(255-y_{dif})-a\} \quad (13)$$

Further, the parameter b can be obtained using $y_{max}$ as follows $$b=Y_{max}-a \cdot y_{max}=255-(255-y_{max})(255-a \cdot y_{dif})/(255-y_{dif})-a \cdot y_{max} \quad (14).$$

Now, step S144 ends.

If the above transforming expression (Y=ay+b) is carried out at every transformation of luminance, this is illogical. This is because the range of luminance y can only be 0 to 255 and hence the luminance Y after transformation can be obtained beforehand for all of the values which the luminance y can take. Therefore, this correlation is determined in step S146 and is stored as such a table as shown in FIG. 21.

At the time when such a transformation table has been formed, it becomes possible to change image data. However, not only highlighting the contrast by such enlargement of the luminance range but also adjustment of brightness is also very effective in attaining the intended object. For example, in the case where the expansion of a luminance distribution is on a dark side as a whole, as indicated with a solid line in FIG. 22, the expansion is preferably shifted to a bright side as a whole, as indicated with a chain line in the same figure. Conversely, when the expansion of a luminance distribution is on the bright side as a whole, as indicated with a solid line in FIG. 23, the expansion is preferably shifted to the dark side as a whole, as indicated with a chain line in the same figure.

In this embodiment, as a result of various experiments, there is adopted a method wherein a median $y_{med}$ in a luminance distribution is determined and when it is smaller than 85, it is judged that the image concerned is a dark image, and the image is brightened by making γ correction which corresponds to the following γ value:

$$\gamma = y_{med}/85 \quad (15) \text{ or}$$

$$\gamma = (y_{med}/85)^{**}(1/2) \quad (16)$$

In this case, even when γ is smaller than 0.7, γ is assumed equal to 0.7. This is because, without such a limitation, a night image would become an image like a daytime image. Excessive brightness would result in a whitish image of weak contrast as a whole, so it is desirable to highlight saturation at the same time.

On the other hand in the case a median $y_{med}$ larger than 128, it is judged that the image concerned is a bright image, and the image is darkened by y correction which corresponds to the following γ value:

$$\gamma = y_{med}/128 \text{ or} \quad (17)$$

$$\gamma = (y_{med}/128)^{**}(1/2) \quad (18)$$

In this case, even when γ is larger than 1.3, γ is assumed equal to 1.3 and thus a limit is set to prevent excessive darkness. Excessive darkness would result in the image being colored too much into a dark image, so it is desirable to weaken the degree of saturation highlighting. For an object in a bright background, however, such a darkening process sometimes exert a bad influence on the image. This is because, for example, in a landscape image wherein the sky occupies a half of the image or in a souvenir picture on a fine day the human face is easily crushed dark due to counter light. Since both dark and bright portions are mixed together in such images, a standard deviation ystd of luminance is relatively high in many cases. Therefore, when the standard deviation ystd is larger than 70, the γ correction for darkening is not performed.

Figure 24:
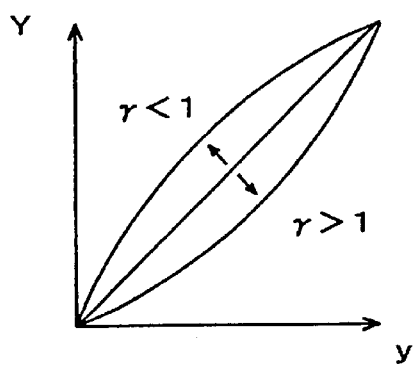
FIG. 24 is a diagram showing a correlation in changing luminance by γ correction.

It is optional whether the γ correction is to be made for the luminance distribution before transformation or for the luminance distribution after transformation. FIG. 24 shows a correlation in the case of γ correction being made. If γ<1, there is obtained an upwardly expanded curve, and if γ>1, there is obtained a downwardly expanded curve. The result of the γ correction may be reflected in the table shown in FIG. 22. The γ correction is made for the table data in step S148. Lastly, in step S510 there is made transformation of image data. The correlations so far obtained are for the transformation of luminance and are not transforming relations for the component values (Rp,Gp,Bp) on RGB coordinate axes. However, the transforming expression (2) is also applicable to the correlation with the component values (Rp,Gp,Bp) of RGB. That is, the component values (R,G,B) are also obtainable as follows relative to the component values(rr, gg, bb) before transformation:

$$R = a \cdot rr + b \quad (19)$$

$$G = a \cdot gg + b \quad (20)$$

$$B = a \cdot bb + b \quad (21)$$

This is apparent from the fact that both expressions (2) and (4) represent linear correlations. Further, correspondingly to the range of 0 to 255 in gray scale of the luminances y and Y, the component values of RGB, i.e., (r,g,b), (R,G,B), are also in the same range. It follows that the foregoing transformation tables of the luminances y and Y can be utilized as they are.

Thus, in step S150, the processing of making reference to the transformation tables corresponding to the expressions (19)~(21) to obtain image data (R,G,B) after transformation is repeated with respect to the image data (rr,gg,bb) of all the pixels.

The entire operation flow is summarized as follows.

In step S102, after the luminance y is obtained with respect to each of the thinned-out pixels to determine a luminance distribution, a judgment is made in step S124 as to whether the image concerned is such a binary image as black-and-white image or not, while in step S128 it is judged whether the image is a natural picture or not. In step S130, it is judged whether a frame portion is included in the image data or not, except the case where the image is a binary image or is not a natural picture, then the frame portion if any is removed and the areas of 0.5% from the upper and lower ends of the luminance distribution obtained are removed to obtain both ends $y_{max}$ and $y_{min}$ of the distribution.

After both ends $y_{max}$ and $y_{min}$ of the luminance distribution have been obtained, parameters a and b are determined from the following relationships in step S144 and a transforming relation from luminance y to luminance Y is stored in a table in step 146:

$$Y = ay + b \quad (2)$$

$$a = 245/(y_{max} - y_{min}) \quad (11)$$

b is any of the following:

$$b = 5 - a \cdot y_{min} \text{ or } 250 - a \cdot y_{max} \quad (12)$$

$$b = Y_{min}\{(255 - a \cdot y_{dif})/(255 - y_{dif}) - a\} \quad (13)$$

$$b = 255 - (255 - y_{max})(255 - a \cdot y_{dif})/(255 - y_{dif}) - a \cdot y_{max}$$

In step S148, γ correction is performed as necessary and in step S150 there is made transformation of image data with respect to all the pixels.

Needless to say, as mentioned above, such an image processing is not performed in the case where the image concerned is a binary image or is not a natural picture. However, when the image processing according to the present invention is performed, it becomes possible to obtain a vivid image sharp in light and shape by making correction so as to widen the luminance range despite a very weak contrast in the state of photograph.

Although in the above example the enlargement ratio is limited to a predetermined certain value, a modification may be made so that it can be selected by the user through a predetermined GUI on the computer 21. It is also possible to let the user designate part of image data and execute such a contrast highlighting process only within the range concerned.

Figure 25:
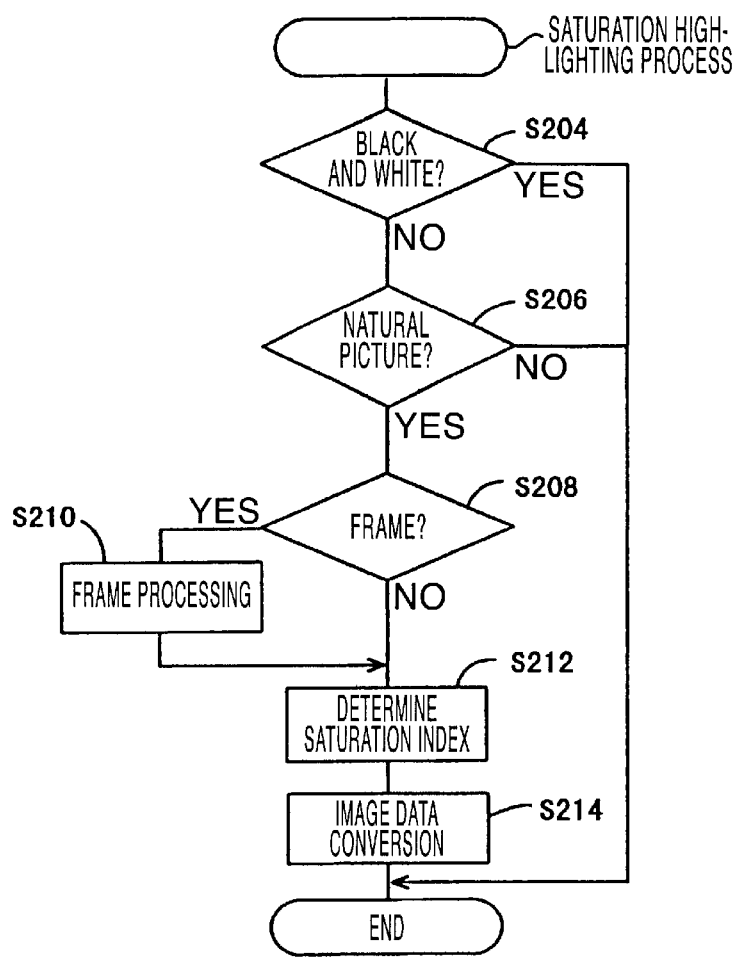
FIG. 25 is a flowchart showing a saturation transforming process performed in the image processing system.

Turning back to the flowchart shown in FIG. 7, the enlargement of contrast is followed by saturation highlighting in step S112. This saturation highlighting process is shown in FIG. 25. Also in the saturation highlighting process, a saturation distribution is obtained beforehand from image data and then a saturation highlighting coefficient S is determined from the saturation distribution. In this case, as is the case with the luminance distribution, it is not necessary to total saturation values of all pixels. Saturation values are obtained and totaled with respect to the pixels thinned out in step S102. If image data has saturation values as its component factors, it is possible to determine a saturation distribution by using the saturation values. Even image data with saturations being not direct component factors are indirectly provided with component values representative of saturation. Therefore, saturation values can be obtained by performing transformation from a color specification space wherein saturations are not direct component factors into a like space wherein saturation values are direct component values. For example, in Luv space as a standard colorimetric space, the L axis represents luminance (lightness), while U and V axes represent hue. In this case, the distance from an intersecting point from both U and V axes represents saturation, so saturation is substantially represented by $(U^{}2+V^{}2)^{**}(\frac{1}{2})$. However, the calculation volume required for such transformation is vast.

In this embodiment, therefore, a saturation value X is determined as follows by directly utilizing standard gradation data of RGB as image data:

$$X = |G + B - 2 \times R| \quad (5)$$

Saturation usually takes a value of 0 in the case of R=G=B and takes a maximum value in the case of a monocolor of RGB or a mixture of any two colors thereof at a predetermined ratio. From this nature it is possible to express saturation appropriately, but also in accordance with the expression (5) there is obtained a maximum value of saturation in the case of a monocolor of red or light blue which is a mixed color of green and blue, with saturation being 0 when the components are uniform. Also as to monocolors of green and blue, about half of the maximum value is obtained.

Where components are represented by almost equal hue component values as in the color specification space of RGB in which the components represent colors each independently, it is possible to make substitution by the following expressions:

$$X' = |R + B - 2 \times G| \quad (6)$$

$$X'' = |G + R - 2 \times B| \quad (7)$$

However, the foregoing expression (5) afforded the best result.

Figure 26:
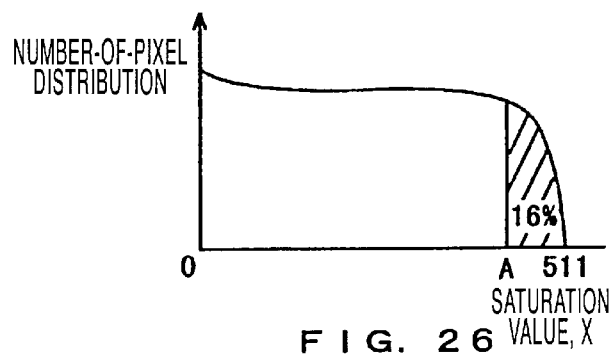
FIG. 26 is a schematic diagram showing a totaled state in a saturation distribution.

If saturations of the pixels after thinning-out are totaled into a saturation distribution from the image data of RGB and in accordance with the expression (5), it is seen that the saturations are distributed in the range from a minimum value of 0 to a maximum value of 511 and that the distribution is substantially like that shown in FIG. 26.

Figure 27:
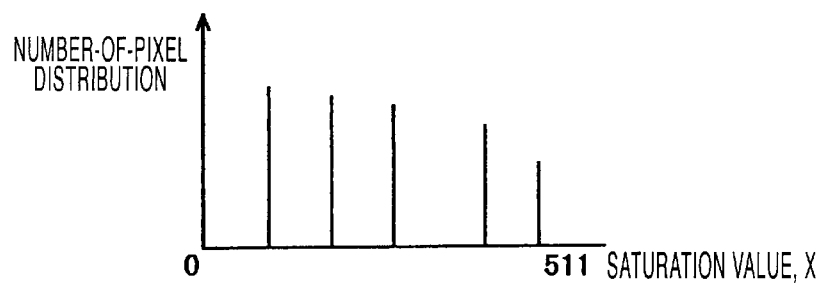
FIG. 27 is a diagram showing a saturation distribution of image data which is not of a natural picture.
Figure 28:
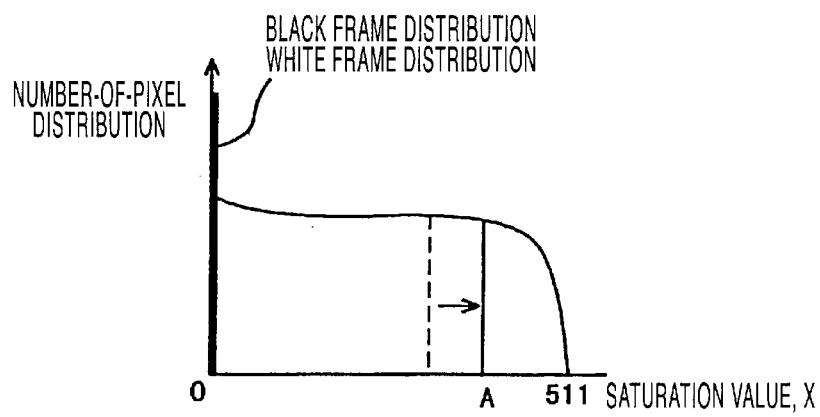
FIG. 28 is a diagram showing a saturation distribution of an image having a frame portion.

However, also in the saturation highlighting process it is necessary that binary black-and-white images, unnatural images such as drawing type images, and framed images, be excluded from the processing. In the case of a binary black-and-white and image, saturation values X concentrate on 0, while in the case of a drawing type business graph there is obtained such a spectral shape as shown in FIG. 27. As to a framed image, as shown in FIG. 28, there is a tendency such that the saturation values X concentrate on 0 despite a gentle distribution. Therefore, these images are identified in steps S204 to S210 and are excluded, then the degree of saturation highlighting is decided.

More specifically, on the basis of a saturation distribution obtained by totaling of saturation values, a saturation highlighting index of the image concerned is determined in step S212. If the saturation distribution obtained is as shown in FIG. 26, then in this embodiment a range occupied by the higher 16% in terms of a distribution number is determined within an effective range of pixels. Then, on the basis of the assumption that the lowest saturation A in the said 16% range represents the saturation of the image, a saturation highlighting index S is determined using the following expressions:

If A<92, $$S=-A\times(10/92)+50 \quad (22)$$

If 92<A<184, $$S=-A\times(10/46)+60 \quad (23)$$

If 184≦A<230, $$S=-A\times(10/23)+100 \quad (24)$$

If 230≦A, $$S=0 \quad (25)$$

Figure 29:
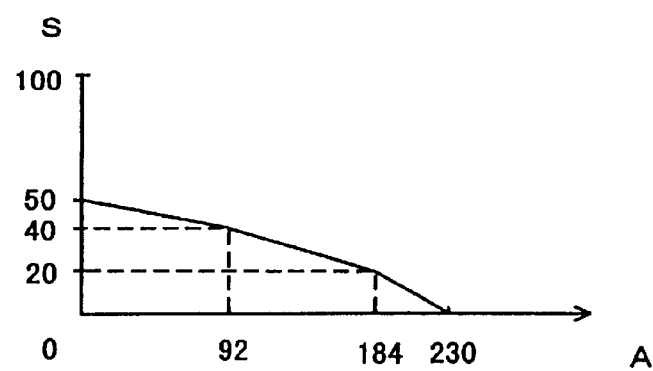
FIG. 29 is a diagram showing a relation between saturation A and a saturation highlighting index S.

FIG. 29 shows a relation between the saturation A and the saturation highlighting index S. As shown in the same figure, the saturation highlighting index S varies gradually in the range from a maximum value of 50 to a minimum value of 0 so as to be large at a small saturation A and small at a large saturation A.

Although in this embodiment there is utilized a saturation range occupied by a certain higher ratio in the totaled saturation distribution, this does not constitute any limitation. For example, a mean value or a median may be used in calculating the saturation highlighting index S. However, using a certain higher ratio in the saturation distribution affords a good result as a whole because a sudden error becomes less influential.

In highlighting the saturation on the basis of the saturation highlighting index S, if image data has a saturation parameter as described above, the said parameter may be transformed. However, in the case where the color specification space of RGB is adopted as in this example, the saturation highlighting can be done by once transforming the space into the Luv space as a standard calorimetric system and subsequent radial shift in the Luv space.

First, with reference to the color transformation table, gradation data (Rx, Gx, Bx) of RGB is transformed into gradation data (L, u, v) of Luv, then the gradation data (L, u, v) is transformed in accordance with the following expressions:

$$u'=(S+100)/100\times u \quad (26)$$

$$v'=(S+100)/100\times v \quad (27)$$

As noted previously, since the saturation highlighting index S ranges from a maximum value of 50 to a minimum value of 0, (u, v) is multiplied a maximum of 1.5 times into (u',v'). Where the image data is of RGB, the gradation data (L, u',v') of Luv is then re-transformed into RGB, whereby this image transforming process is terminated.

Figure 30:
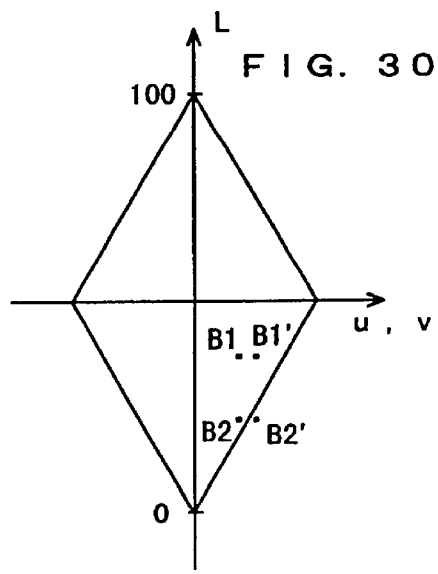
FIG. 30 is a diagram showing a saturation highlighting limit in Luv space.

In the transformations of expressions (26) and (27) the saturation highlighting is performed irrespective of the parameter L, but such transformations are sometimes undesirable. FIG. 30 shows a state in which the Luv space is cut vertically. As shown in the same figure, this color specification space is of a shape such that the bottoms of two cones having vertexes at L=0 and L=100 are made face to face with each other. Therefore, if coordinate values of (u, v) are shifted radially outwards for enlargement in accordance with the expressions (26) and (27), it is possible to shift the coordinate values from point B1 to point B1' in a range where the luminance L is not so small, but in a range where the luminance L is very small, a shift from point B2 to point B2' results in breaking through the space which is in an inverted cone shape. Such a transformation is actually infeasible and results in deviation of hue.

As a countermeasure, the saturation highlighting index S is shifted in proportion to the luminance L. To be more specific:

If L<30, $$S'=S\times 0=0 \quad (28)$$

If 30≦L<50, $$S'=S\times 0.8 \quad (29)$$

If 50≦L, $$S'=S \quad (30)$$

Even in the portion of a large luminance L the aforesaid displacement will result in breaking through a conical space, for which the same correction as above may be effective. In printing with a printer, however, the image data of the portion with a large luminance L is presented nearly whitely, so there seems to be little influence of color shift. For this reason it turned out that the above correction need not be performed even for speed-up of processing.

In the above example the saturation highlighting is performed by once transforming the image data of RGB to the image data in the Luv space and, after saturation highlighting, re-transforming to RGB, with the result that the increase of the calculation volume is unavoidable. In view of this point, a description will be given below of a modification in which the gradation data of RGB is utilized as it is in saturation highlighting.

When component values are of hue components which are in a substantially equal relation like the color specification space of RGB, the relation of R=G=B results in gray which is free of saturation. Therefore, assuming that the component of a minimum value among the components of RGB merely causes the saturation to drop without influencing the hue of each pixel, it can be said that the saturation can be highlighted by subtracting such minimum value from all the component values and enlarging the resultant differential value.

First, a saturation highlighting parameter S ratio advantageous to calculation is determined from the above saturation highlighting index S, as follows:

$$S\ ratio = (S+100)/100 \tag{31}$$

In this case, when the saturation highlighting index S is 0, the saturation highlighting parameter S ratio becomes equal to 1, at which saturation is not highlighted. Next, assuming that the component value of blue (B) is a minimum value among the components (R,G,B) of RGB gradation data, transformation is performed as follows using the saturation highlighting parameter S ratio:

$$R' = B + (R-B) \times S\ ratio \tag{32}$$

$$G' = B + (G-B) \times S\ ratio \tag{33}$$

$$B' = B \tag{34}$$

As a result, the two color transformations which reciprocate once between the color specification space of RGB and the Luv space become unnecessary, and therefore it is possible to shorten the calculation time. In this example there is adopted a method wherein a minimum value of component is simply subtracted from the other component values with respect to a saturation-free component, but in the subtraction of the saturation-free component there may be adopted another transforming expression. However, the transformations of the above expressions (32) to (34) are advantageous in that the calculation volume is reduced because the only subtraction of a minimum value does not involve multiplication and division.

The adoption of expressions (32) to (34) makes a satisfactory transformation possible, but in this case the highlighting of saturation tends to improve of luminance, resulting in the whole becoming bright. In view of this point, the following transformation example uses a differential value obtained by subtracting an equivalent value of luminance from each component value.

First, if the color transformation is made into the above Luv space for the determination of luminance, the calculation volume will become very large, so there is utilized the following transforming expression which determines the luminance directly from RGB and which is used in television for example as is the case with the expression (9):

$$Y = 0.30R + 0.59G + 0.11B \tag{35}$$

On the other hand, saturation highlighting is based on the following expressions:

$$R' = R + \Delta R \tag{36}$$

$$G' = G + \Delta G \tag{37}$$

$$B' = B + \Delta B \tag{38}$$

The adjustable values $\Delta R$, $\Delta G$ and $\Delta B$ are obtained as follows each on the basis of a differential value from the luminance:

$$\Delta R = (R-Y) \times S\ ratio \tag{39}$$

$$\Delta G = (G-Y) \times S\ ratio \tag{40}$$

$$\Delta B = (B-Y) \times S\ ratio \tag{41}$$

As a result, $$R' = R + (R-Y) \times S\ ratio \tag{42}$$

$$G' = G + (G-Y) \times S\ ratio \tag{43}$$

$$B' = B + (B-Y) \times S\ ratio \tag{44}$$

Thus, transformation can be effected. That the luminance is retained is evident from the following expressions:

$$Y' = Y + \Delta Y \tag{45}$$

$$\Delta Y = 0.30\Delta R + 0.59\Delta G + 0.11\Delta B \tag{46}$$
$$= S\ ratio \times \{(0.30R + 0.59G + 0.11B) - Y\}$$
$$= 0$$

When the inputted image is gray (R=G=B), the luminance Y is in the relation of Y=R=G=B, so that the adjustable values are in the relation of $\Delta R = \Delta G = \Delta B = 0$, with no color developed in the saturation-free color. By using the expressions (42) to (44), the luminance is retained and the whole of the image does not become bright even if saturation is highlighted.

For the transformation of image data in step S214, any of the above methods is used and the operation of obtaining RGB gradation data (R',G',B') after transformation from the RGB gradation data of each pixel is performed for all the pixels.

The above saturation highlighting process can be summarized as follows.

Saturation values X of the pixels thinned out in step S102 are determined and totaled into a saturation distribution, then it is judged in step S204 whether the inputted image is a binary image such as a black-and-white image or not, while in step S206 it is judged whether the image is a natural picture or not. Then, except the case where the image is a binary image and the case where it is not a natural picture, it is judged in step S208 whether the image data is framed or not. If there is a frame portion, it is removed and the minimum saturation A is determined in a predetermined higher range of the resulting saturation distribution.

Once the minimum saturation A is obtained, a saturation index (saturation highlighting index) S is determined from the range to which the saturation A belongs and in accordance with the following expressions:

$$\text{If } A<92, S=-A\times(10/92)+50 \tag{22}$$

$$\text{If } 92 \leq A<184, S=-A\times(10/46)+60 \tag{23}$$

$$\text{If } 184 \leq A<230, S=-A\times(10/23)+100 \tag{24}$$

$$\text{If } 230 \leq A, S=0 \tag{25}$$

On the basis of the saturation highlighting index S thus obtained, there is made transformation of image data in step S214. As an example, if the gradation data of RGB is utilized directly while retaining luminance, the transformation of image data is performed for all the pixels in accordance with the following expressions:

$$R' = R + (R-Y) \times S\ ratio \tag{42}$$

$$G' = G + (G-Y) \times S\ ratio \tag{43}$$

$$B' = B + (B-Y) \times S\ ratio \tag{44}$$

By so doing, even in the case of a photograph with weak saturation, it is possible to highlight saturation which varies in a narrow range, to obtain a vivid image. Thereafter, if the image data is outputted as RGB to the display 32, a vivid image will be reproduced on the screen, and if it is outputted to the printer 31, a vivid image will be reproduced on paper by transformation to the CMYK color specification space of color ink and subsequent gradation transformation.

Needless to say, as noted previously, such processing is not applied to a binary image or an image which is not a natural picture. Although in the above example the conditions for selecting the saturation highlighting index is made constant, a modification may be made so that the user can select it through a predetermined GUI on the computer 21. By so doing, transformation is made automatically so as to give an optimum range on the basis of the value set by the user. Particularly, without transformation to the Luv space, hues may not always be retained. In this case some measure maybe taken so that the shift of hue can be ignored. For example, the saturation highlighting index S is weakened to prevent rotation of the coloring matters. Further, it is suggested to make the aforesaid plural transforming methods selectable or provide optimum settings of saturation highlighting index for those methods. It is also possible for the user to designate part of image data so that the saturation highlighting process is executed only within the range concerned.

If the expressions (42) to (44) are utilized in the saturation highlighting process, luminance is retained and the whole does not become bright even when saturation is highlighted. In the case of highlighting only saturation in the above manner, there arises no problem, but when the contrast enlarging process and the saturation highlighting process are executed simultaneously, the resulting synergistic effect will make the image loud.

Figure 31:
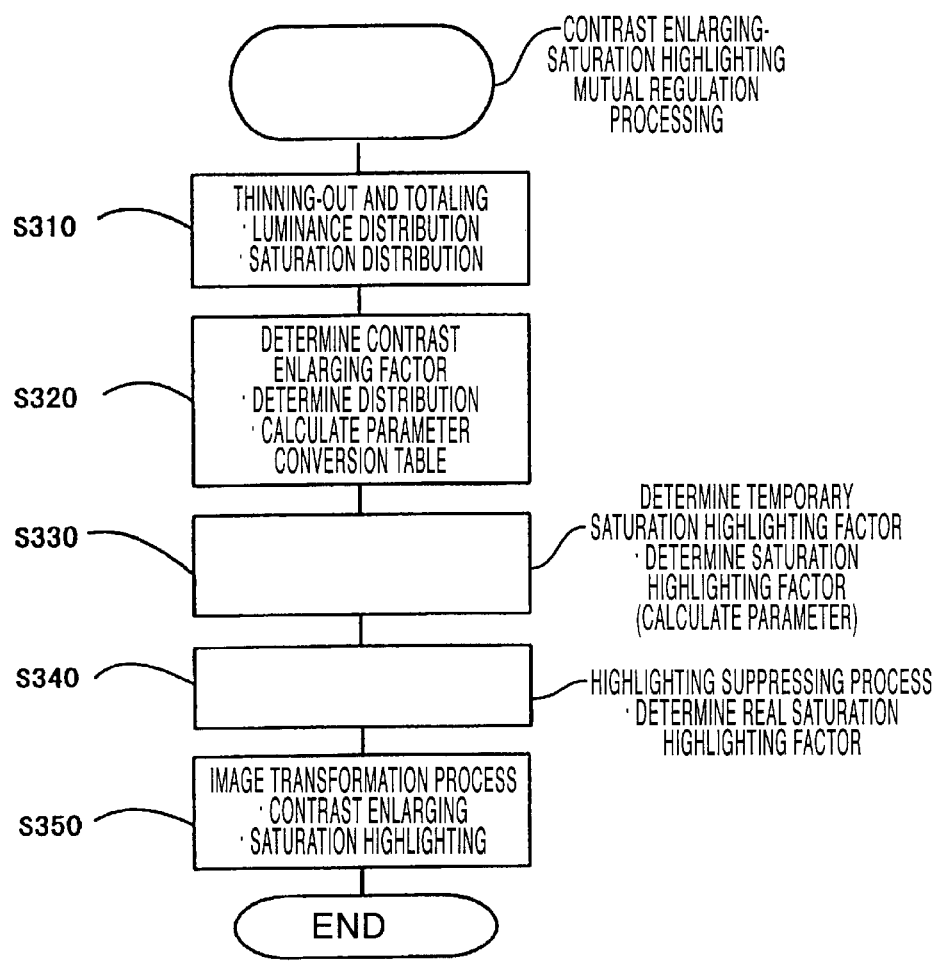
FIG. 31 is a flowchart showing image processing according to the present invention.

To avoid this inconvenience, a correlation may be taken to suppress both processings relative to each other. FIGS. 31 to 33 illustrate a contrast enlarging-saturation highlighting interadjusting process, of which FIG. 31 shows a main processing in the said interadjusting process, and FIGS. 32 and 33 show the contrast enlarging process and the saturation highlighting process each individually in more detail. The details of these processings are the same as those described above and are therefore omitted here.

In step S310 there are performed thinning-out and totaling of pixels, then in steps S320 and S330 which are front stages of both contrast enlarging process and saturation highlighting process there are obtained a contrast enlarging coefficient "a" and a saturation highlighting coefficient S, and thereafter in step S340 which corresponds to a medium stage there is executed a highlighting suppressing process to determine a formal saturation highlighting coefficient S'. Thus, in this example, the contrast enlarging coefficient "a" is first determined and with this coefficient fixed there is performed the highlighting suppressing process to determine the formal saturation highlighting coefficient S'.

The contrast enlarging coefficient "a" and the formal saturation highlighting coefficient S' are correlated with each other in the following manner:

$$S' = S \times (1/a) \quad (47)$$

As mentioned previously, the contrast enlarging coefficient "a" is 1 or larger and (1/a) becomes smaller than 1 as the enlargement tendency becomes stronger. Consequently, the formal saturation highlighting coefficient S' becomes smaller than the temporary saturation highlighting coefficient S determined in the above manner. That is, the parameter used in the saturation highlighting process is made small by the parameter used in the contrast enlarging process to suppress the highlighting process.

Figure 34:
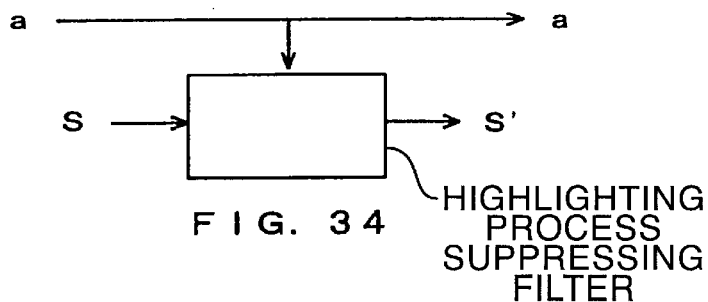
FIG. 34 is a diagram showing an application concept of a highlighting suppressing process applied in the embodiment.
Figure 35:
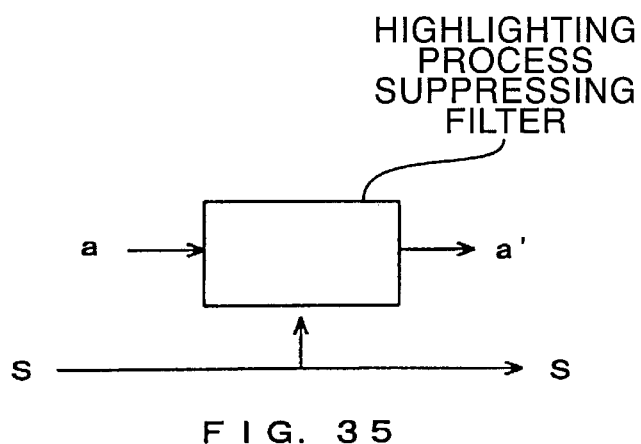
FIG. 35 is a diagram showing an application concept of a highlighting suppressing process applied in a modified embodiment according to the present invention.
Figure 36:
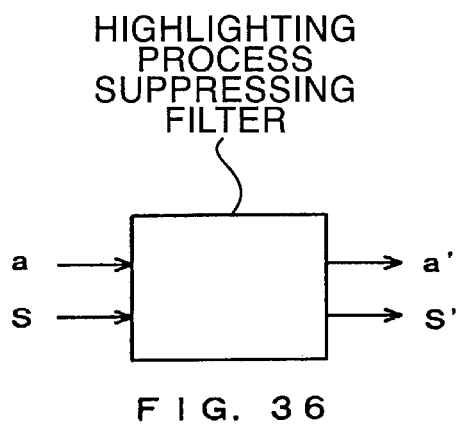
FIG. 36 is a diagram showing an application concept of a highlighting suppressing process applied in another modified embodiment according to the present invention.

In this example, as shown in FIG. 34, a correlation is taken such that the saturation highlighting coefficient S is weakened by the contrast enlarging coefficient "a." In this sense it can be said that a highlighting process suppressing filter is provided. However, as shown in FIG. 35, it is also possible to make a correlation so that the contrast enlarging coefficient "a" is weakened by the saturation highlighting coefficient S. Further, a correlation may be made as shown in FIG. 36 in which both coefficients are weakened relative to each other. Not a simple filter but a transformation table may be prepared for reference to concrete values of the contrast enlarging coefficient "a" and the saturation highlighting coefficient S, as shown in FIGS. 37(A) and (B). Such a transformation table permits a more detailed setting.

There also is the case where it is not necessary to weaken both coefficients relative to each other. For example, when the contrast enlarging coefficient "a" and the saturation highlighting coefficient S are small, both may act each individually and may not exert a synergistic bad influence. In such a case, there may be provided a non-interference area as in FIG. 38 so that both coefficients are subject to a weakening influence upon reaching respective certain threshold values. It is also possible to let one coefficient act on the other so as to weaken the other upon reaching a certain threshold value or larger.

After the highlighting process has been suppressed as above by using the operation expression (47) or using the transformation table, there lastly is performed in step S350 the transformation of image data with use of the foregoing highlighting coefficients. More specifically, in correspondence to the rear stage of each of the above processings, data transformation is performed pixel by pixel with respect to the image data of each attentional pixel.

Figure 39:
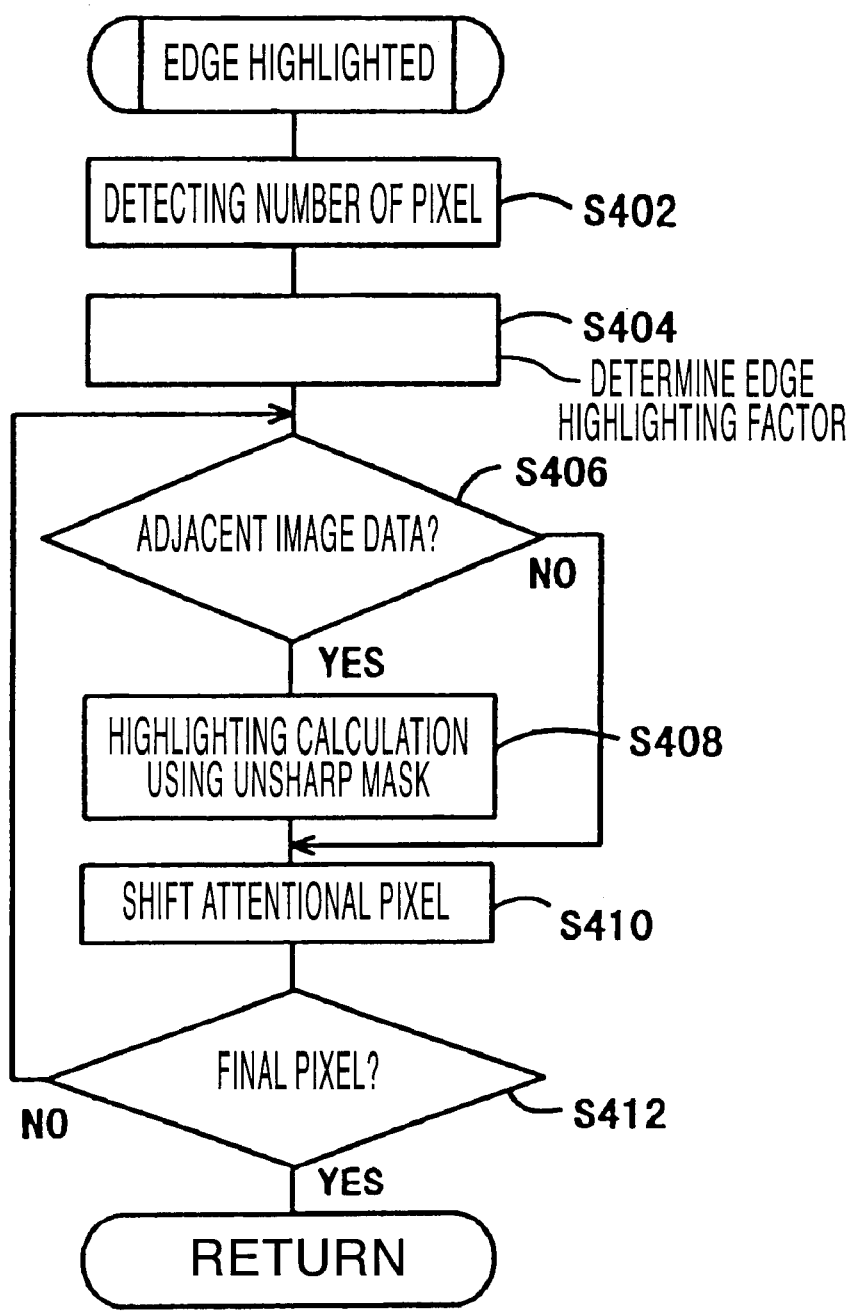
FIG. 39 is a flowchart showing an edge highlighting process provided as an image processing.

Turning back to the flowchart of FIG. 7, after the end of both contrast enlarging process and saturation highlighting process as described above, an edge highlighting process is executed in step S114, which process is illustrated in FIG. 39.

In the edge highlighting process, the number of pixels in the width direction of the inputted image and that in the height direction are multiplied together to obtain the number of pixels in step S402. Then, in step S404 there is determined an edge highlighting degree proportional to the thus-detected number of pixels. The edge highlighting degree depends greatly on the edge highlighting method, so reference will first be made to the edge highlighting method. In this example there is used such an unsharp mask 40 as shown in FIG. 40. In the unsharp mask 40, the central value "100" is used as a weight of an attentional pixel Pij in a matrix-like image data and the marginal pixels are weighted correspondingly to the numerical values described in the squares of the mask and are utilized for integration, which is performed in accordance with the following expression (48) if the unsharp mask 40 is used:

$$P'ij = (1/632) \sum_{ij} (Mij \times Pij) \quad (48)$$

In expression (48), "632" stands for a total value of weighting coefficients, Mij stands for a weight coefficient described in each square of the unsharp mask, and Pij stands for image data of each pixel, in which ij represents coordinate values of columns and rows.

Given that the image data after edge highlighting is assumed to be Qij, the edge highlighting calculation is performed in accordance with the following expression (49):

$$Qij = Pij + C \times \{Pij - P'ij\} \quad (49)$$

The meaning of the expression (49) is as follows. P'ij stands for the result of addition at a low weight of the marginal pixels relative to the attentional pixel and hence it is an unsharp image data, which is the same as image data having passed through a low-pass filter. Therefore, "Pij−P'ij" represents the result of having subtracted a low frequency component from all the components, indicating the same image data as that having passed through a high-pass filter. Then, if this high frequency component from the high-pass filer is multiplied by an edge highlighting coefficient C and the result is added to Pij, it follows that the high frequency component has been increased in proportion to the edge highlighting coefficient. The edge is highlightened in this way.

Also in this sense the edge highlighting degree can be changed by the edge highlighting coefficient C. Therefore, if the number of pixels is large, the edge highlighting coefficient C is increased, while if the number of pixels is small, the coefficient C is decreased. In an image width and height condition of width×height, E ratio is represented by the following expression (50):

$$E\ ratio = min(width, height)/640+1 \tag{50}$$

For the E ratio thus obtained, the edge highlighting coefficient C was determined as follows:

For E ratio<1, C=1

For 1≤E ratio<3, C=2

For 3≤E ratio, C=3

To be more specific, the edge highlighting coefficient C is 1 if the number of shorter pixels is less than 640, C is 2 if the said number is 640 or more and less than 1920, and C is 3 if the said number is 1920 or more. Although the edge highlighting coefficient C is set as above in this example, it may be varied in a proportional manner because the image size may change in some particular dot density.

Since the edge highlighting degree varies also according to the size of the unsharp mask, a large size of an unsharp mask can be used for a large number of pixels, or a small size of an unsharp mask for a small number of pixels. Needless to say, both edge highlighting coefficient C and unsharp mask 40 may be changed, or the edge highlighting degree may be changed with respect to only one of the two. As is seen also from the figure, the unsharp mask 40 is most heavily weighted at the central portion and gradually becomes smaller in the values of weighting toward the marginal portion. This degree of change is not always fixed but may be changed as necessary.

In the unsharp mask 40 of 7×7 shown in FIG. 40, the weighting value of the outermost peripheral squares is 0 or 1. As to 0, a weighting multiplication is meaningless, and the weighting of 1 has only a very slight weight in comparison with the total square value of 632. In this example, therefore, such an unsharp mask 41 of 5×5 as shown in FIG. 41 is used as a substitute for the unsharp mask 40 of 7×7. The unsharp mask 41 corresponds to an unsharp mask obtained by omitting the outermost periphery of the 7×7 unsharp mask 40. Both are coincident with each other. At the inside 5×5 mask portion the unsharp mask 40 coincides in weighting with the unsharp mask 41. As a result, a concrete processing volume is reduced by half.

In this example, moreover, the operation volume is reduced in the following manner. In the case where the gradation data of RGB is to be processed, each component value corresponds to the luminance (lightness) of the associated color component. Therefore, the calculation of the expression (49) should be performed individually for each gradation data of RGB. However, if multiplication and addition are repeated by the number to times corresponding to the number of the squares of the unsharp mask 40, such an individual operation for each component inevitably results in a large operation volume.

On the other hand, it can be said that such edge highlighting can be done by changing luminance while retaining hue. It follows that the processing volume is decreased by making calculation for the luminance obtained, not for the component values of RGB. If the foregoing transforming expression of luminance Y is used, the expressions (48) and (49) can be rewritten as follows:

$$Y'ij=(1/632)\Sigma(Mij\times Yij) \tag{51}$$

$$Y''ij=Yij+C\ (Yij-Y'ij) \tag{52}$$

Further, Yij−Y'ij may be rewritten as follows:

$$delta=Yij-Y'ij \tag{53}$$

R', G' and B' after transformation can be calculated as follows:

R'=R+delta×C

G'=G+delta×C $$B'=B+delta\times C \tag{54}$$

As a result, the number of times of multiplication and addition is reduced to one third, so that the total processing time can be diminished about 50~70%. According to the results of the transformation, there no longer was any highlighting of color noise and the image quality was improved.

The edge highlighting process corresponds to a process wherein image data (R'G'B') after edge highlighting is calculated using the unsharp mask 40 with respect to each pixel in the matrix-like image data. In steps S406 to S412 is represented a loop processing wherein the edge highlighting process is repeated for each pixel. In step S410 included in the loop processing, an attentional pixel is shifted successively in both horizontal and vertical directions, and this processing is repeated until when the pixel being processed is judged to be the final pixel in step S412.

In the operation of expression (48), however, both multiplication and addition are needed by the number of the squares of the unsharp mask 40 for the pixels located around the attentional pixel, resulting in that the processing volume is very large. On the other hand, the portion which requires edge highlighting is the edge portion of the inputted image and is therefore limited to the portion where image data are markedly different between adjacent pixels. Under the circumstances, it can be said that operation may be made only in the case of a great difference in image data between adjacent pixels.

To be more specific, in step S406 there is made a comparison between adjacent pixels with respect to image data and only when the resulting difference is large, the operation using the unsharp mask in step S408 is conducted. By so doing, in most of the image data portion, not the edge portion, it is no longer required to perform the operation using the unsharp mask and thus the processing volume is decreased markedly.

As shown in FIG. 42, the above comparison is required eight times because there are eight pixels around the attentional pixel. However, when there is made a comparison, for example, between the attentional pixel located at the center and the pixel of square "5," it is seen that when the attentional pixel was previously the square "5" there was made a comparison once with the pixel of square "1." Therefore, assuming that it is sufficient for adjacent pixels to be compared only once, any one alone is sufficient for comparison with respect to the combinations opposite in direction of 1 and 5, 2 and 6, 3 and 7, and 4 and 8. Comparison is made in four directions in the said combinations.

In this way, as to a natural picture using a large number of colors, the enlargement of contrast is performed automatically within an optimum range, and saturation highlighting and edge highlighting are also conducted automatically at a highlighting degree best suited for the image concerned. Needless to say, in the case of an image which is not a natural picture, such processings are skipped as unnecessary processings.

Figure 43:
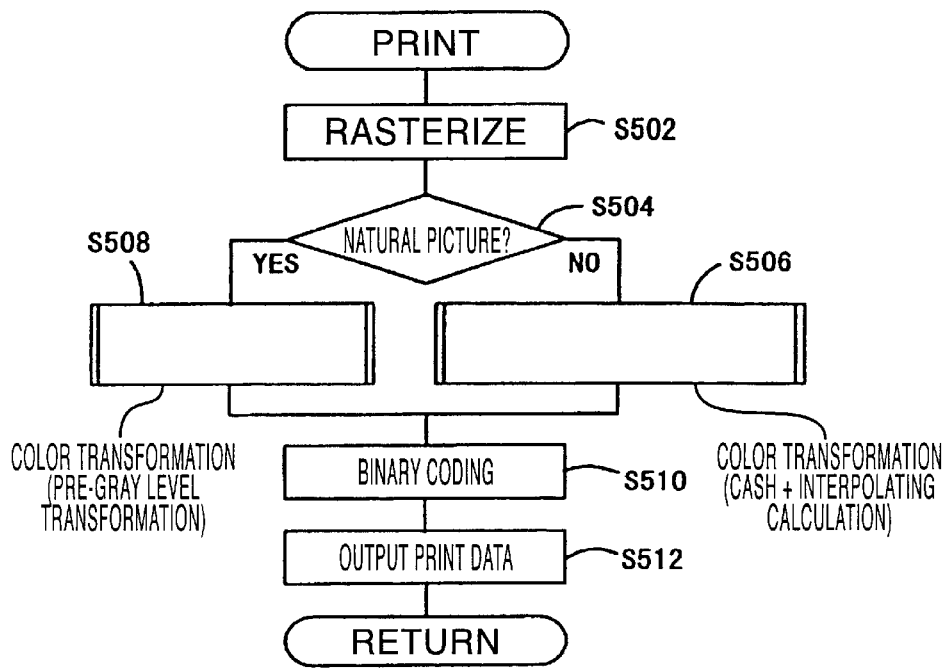
FIG. 43 is a flowchart showing in what procedure a printer driver performs a printing process.

Although an optimum image processing has been conducted above in the application 21d on the basis of the type of image data detected from the number of colors used, also in the printing process an optimum processing is also selected according to the type of image detected. FIG. 43 is a flowchart showing a processing corresponding to the printing process. In step S502 there is formed a raster data, then in step S504 the type of image data is judged on the basis of the foregoing flag, and any one of steps S506 and S508 as color transformation processings is executed. Thereafter, binary coding is performed in step S510 and printing data is outputted in step S512.

Figure 44:
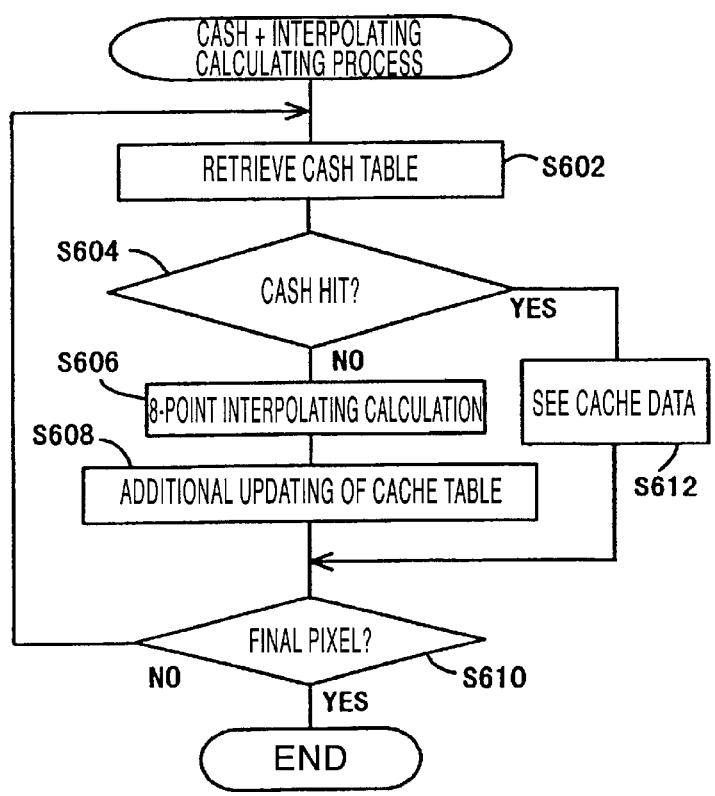
FIG. 44 is a flowchart of a color transformation processing using a cache+interpolating calculation process.

It is a color transformation processing as a combination of both interpolating operation processing and cache processing that is carried out in step S506. The procedure thereof is shown in FIG. 44. In the interpolating operation shown in the same figure there is performed not only an 8-point interpolating operation involving substantial operations but also caching for color transformation without any substantial operation.

As to the 8-point interpolating operation, its principle is shown in FIG. 45. A cube comprising eight lattice points around coordinates P involving RGB gradation data as component values in a color specification space before transformation is here assumed. Given that the transformation value at kth vertex of the cube is Dk and the volume of the cube is V, a transformation value Px at point P of the cube can be interpolated as follows from a weight based on the ratio of volume Vk of such eight small rectangular parallelepipeds as shown in the figure which are divided at point P:

$$Px = \sum_{k=1}^{8} (Vk/V) \cdot Dk \quad (55)$$

Therefore, eight lattice points which surround the coordinates are specified and calculation is performed for each of CMY gradation data at each lattice point.

With reference to the flowchart of FIG. 44 shows that in the processing routine of this interpolating operation the said 8-point interpolating operation is not always carried out, but there is performed caching for omitting the 8-point interpolating operation while making reference to such a caching table as shown in FIG. 46. This caching table is a table of a certain capacity for retaining CMY gradation data obtained by executing the 8-point interpolating operation using the RGB gradation data before transformation. Initially, this table is blank, but the CMY gradation data obtained just after execution of the 8-point interpolating operation in step S606 is added and updated in step S608. When the processing routine of "cache+interpolating operation" is executed in step S506 as shown in FIG. 43, the interior of the cache table is retrieved using the gradation data of RGB before transformation as component values in the first step S602, and upon cache hit (discovery by the retrieval), reference is made in step S612 to the CMY gradation data stored.

In the color transformation processing, the processing is repeated until the final image is obtained in step S610 for transformation of the RGB gradation data into CMY gradation data with respect to each of the dot matrix-like pixels.

Although such an interpolating operation is large in the operation volume, but since the number of colors used is small in the case the inputted image is not a natural picture, the result of a single operation can be utilized repeatedly. Therefore, when it is judged that the type of image data is not a natural picture, it can be said that the processing "cache+interpolating operation" is very effective.

Next, reference will be made below to the pre-gray level transformation of step S508 which is another color transformation processing.

The flowchart of FIG. 47 and the diagram of FIG. 48 showing an error distribution of pixel are for explaining an outline of the pre-gray level transformation. Since the basic expression of the foregoing 8-point interpolation requires multiplication eight times and addition seven times, resources and time consumption are large in both hardwarization and execution using software. For easier color transformation, therefore, the applicant in the present case has developed a gray level transformation as a substitute for the interpolating operation in Japanese Patent Laid Open No. 30772/95.

The pre-gray level transformation disclosed in the above unexamined publication uses an error diffusing method for example for gray level transformation of pixel gradation data into coincidence with lattice coordinates. Lattice coordinates proximate to the pixel to be transformed are searched for (S702), then an error (dg) from the lattice coordinates is calculated (S704), and the error (dg) is distributed to nearby pixels (S706). This is all of the processing. Thus, the burden of the operation can be lightened to a great extent in comparison with the repetition of multiplication and addition. As to the reason why high accuracy can be maintained without interpolating operation, it is fully stated in the above unexamined publication, so a detailed description thereof is here omitted. Since a gray level transformation for binary coding is performed even after color transformation, the gray level transformation conducted first is called herein a pre-gray level transformation.

Also in the pre-gray level transformation, gray level transformation is conducted for each of rasterized dot matrix-like pixels and therefore the processing is repeated until the final pixel in step S708. In the subsequent step S710, reference is made to the color transformation table using the RGB gradation data after gray level transformation. At this time, because of lattice points, it is not necessary to conduct an interpolating operation and thus the reading process is very easy.

In the case where the number of colors used is very large like a natural picture, the probability of hit is low even in the foregoing processing of cache+interpolating operation, so that the number of interpolating operation increases. In such a pre-gray level transformation it is necessary to execute such a processing as error diffusion for all the pixels, but the processing volume as a whole is small because the processing conducted each time is simple. Therefore, with respect to image data using many colors and having been judged to be a natural picture, the entire processing volume can be reduced by selecting a suitable color transformation processing based on such pre-gray level transformation.

In the embodiment being considered there is adopted the color transformation processing of cache+interpolating operation for an unnatural picture small in the number of colors used, while for a natural picture using many colors there is adopted a color transformation processing based on the pre-gray level transformation. However, no limitation is placed on such a combination. It is also possible to adopt another combination. In other words, a color transformation processing most suitable for the type of inputted image may be selected freely and utilized automatically.

Thus, by totaling luminance values of pixels which have been selected by a thinning-out processing for their image data, to obtain a luminance distribution, (step S102), it becomes possible to count the number of colors used (step S104). As a result, if the number of colors used is large, the related image data can be judged to be a natural picture. Besides, it becomes possible to automatically select a contrast enlarging process (step S110), a saturation highlighting process (S112) and an edge highlighting process (S114) which are suitable for application to the natural picture, on the basis of the said result of judgment. Also in the printing process, a color transformation based on the pre-gray level transformation is performed if the image data concerned is a natural picture (S508), while if the image data concerned is not a natural picture, there is performed the color transformation of "cache+interpolating" operation (S506), and thus it is possible to automatically select a color transformation processing of a small processing volume.

What is claimed is:

1. An image processing system including:
   a luminance distribution totaling means for:
      inputting image data representing information of each pixel of a plurality of pixels resolved from a dot matrix form of an image, and
      determining luminance distribution of the plurality of pixels and obtaining minimum and maximum luminance values of the distribution,
      wherein the minimum and maximum luminance values are the luminance values of the portions which are located inside of the actual minimum and maximum portions of the luminance distribution by a predetermined distribution ratio; and
   an image data luminance transforming means for transforming a luminance information of each pixel in the image data, so that transformed luminance values of the plurality of pixels are dispersed in an enlarged luminance distribution in an effective luminance range;
   wherein the luminance information comprises an indication of a luminance level for each pixel.

2. An image processing system according to claim 1, wherein said image data luminance transforming means compares a statistical width of the luminance distribution with a width of said effective luminance range and determines an enlargeable degree as an enlargement ratio, determines an adjustment value so that upper and lower ends of the enlarged luminance distribution are received within said effective luminance range, and amends the luminance information of each pixel individually.

3. An image processing system according to claim 2, wherein, when a reproducible luminance range is assumed to be $y_{range}$, said image data luminance transforming means determines a luminance Y after transformation from a luminance y before transformation and from a maximum value $y_{max}$ and a minimum value $y_{min}$ of the luminance distribution, in accordance with:

Y=ay+b where, $a=y_{range}/(y_{max}-y_{min})$ $b=-a \cdot y_{min}$ or $y_{range}-a \cdot y_{max}$ and if Y is smaller than 0, Y is set equal to 0, and if Y is larger than $y_{range}$, Y is set equal to $y_{range}$.

4. The image processing system according to claim 3, wherein $1 \leq a < 2$.

5. An image processing system according to claim 1, wherein said image data luminance transforming means determines a luminance before transformation and a maximum distribution luminance and executes γ correction to change the luminance distribution so that the range to which said maximum distribution luminance belongs has a desired brightness.

6. An image processing system according to claim 1, wherein said image data luminance transforming means sets an enlarged luminance distribution inside end portions of said luminance range by a predetermined amount.

7. An image processing system according to claim 1, wherein a limit is placed on an enlarged range of the luminance distribution.

8. An image processing system according to claim 7, wherein said image data luminance transforming means causes the position of the luminance distribution before transformation and that of the luminance distribution after transformation to be retained within said luminance range.

9. An image processing system according to claim 8, wherein the ratio of an enlargeable range which remained at each of both upper and lower ends of the luminance distribution range before transformation is retained also after transformation.

10. The image processing system according to claim 1, wherein said effective end portions of the luminance distribution define a percentage of a total area distribution of the luminance distribution relative to actual end portions of the luminance distribution.

11. The image processing system according to claim 10, wherein the percentage of total area distribution from each actual end portion to its respective effective end portion is more than 0% and less than 1% of the total area distribution.

12. An image processing method for applying a predetermined image processing to image data which represents information of each pixel of a plurality of pixels resolved from a dot matrix form of an image, said method comprising:
   a luminance distribution totaling step for:
      inputting the image data representing the information of each pixel of the plurality of pixels resolved from the dot matrix form of the image, and
      determining luminance distribution of the plurality of pixels and obtaining minimum and maximum luminance values of the distribution,
      wherein the minimum and maximum luminance values are the luminance values of the portions which are located inside of the actual minimum and maximum portions of the luminance distribution by a predetermined distribution ratio; and
   an image data luminance transforming step for transforming a luminance information of each pixel in the image data, so that transformed luminance values of the plurality of pixels are dispersed in an enlarged luminance distribution in an effective luminance range;
   wherein the luminance information comprises an indication of a luminance level for each pixel.

13. The image processing method according to claim 12, wherein in the totaling step, the luminance distribution is determined as having a first effective end portion $y_{min}$ and a second effective end portion $y_{max}$ which are displaced from actual first and second end portions of the luminance distribution, wherein the first effective end portion and the first actual end portion define a first percentage of a total area distribution in said luminance distribution and said second effective end portion and the second actual end portion define a second percentage of the total area distribution in said luminance distribution.

14. The method according to claim 13, wherein in said transforming step, a reproducible luminance range is $y_{range}$, and a luminance Y after transformation is determined according to $y_{min}$ and $y_{max}$ in accordance with:

Y=ay+b where, $a=y_{range}/(y_{max}-y_{min})$ $b=-a \cdot y_{min}$ or $y_{range}-a \cdot y_{max}$ and if Y is smaller than 0, Y is set equal to 0, and if Y is larger than $y_{range}$, Y is set equal to $y_{range}$.

15. A medium having an image processing control program recorded thereon for inputting in a computer image data which represents information of each pixel of a plurality of pixels resolved from a dot matrix form of an image and for performing a predetermined image processing, said image processing control program being adapted to perform steps, comprising:

a luminance distribution totaling step for:

inputting the image data representing the information of each pixel of the plurality of pixels resolved from the dot matrix form of the image, and determining luminance distribution of the plurality of pixels and obtaining minimum and maximum luminance values of the distribution, wherein the minimum and maximum luminance values are the luminance values of the portions which are located inside of the actual minimum and maximum portions of the luminance distribution by a predetermined distribution ratio; and an image data luminance transforming step for transforming a luminance information of each pixel in the image data, so that transformed luminance values of the plurality of pixels are dispersed in an enlarged luminance distribution in an effective luminance range;

wherein the luminance information comprises an indication of a luminance level for each pixel.

16. The medium according to claim 15, wherein the program code means for inputting and totaling luminance values determines the luminance distribution as having a first effective end portion $y_{min}$ and a second effective end portion $y_{max}$ which are displaced from actual first and second end portions of the luminance distribution, wherein the first effective end portion and the first actual end portion define a first percentage of a total area distribution in said luminance distribution and said second effective end portion and the second actual end portion define a second percentage of the total area distribution in said luminance distribution.

17. The medium according to claim 16, wherein said program code means for determining and transforming determines a luminance Y after transformation according to $y_{min}$ and $y_{max}$ in accordance with:

Y=ay+b where, $a=y_{range}/(y_{max}-y_{min})$ $b=-a \cdot y_{min}$ or $y_{range}-a \cdot y_{max}$ and if Y is smaller than 0, Y is set equal to 0, and if Y is larger than $y_{range}$, Y is set equal to $y_{range}$.

* * * * *

UNITED STATES PATENT AND TRADEMARK OFFICE
CERTIFICATE OF CORRECTION

| | | |
|---|---|---|
| PATENT NO. | : 6,351,558 B1 | Page 1 of 1 |
| DATED | : February 26, 2002 | |
| INVENTOR(S) | : Kuwata, Naoki | |

It is certified that error appears in the above-identified patent and that said Letters Patent is hereby corrected as shown below:

<u>Title page,</u>
Item [30], Foreign Application Priority Data, delete "8-302233" insert -- 8-302223 --.

Signed and Sealed this

Fifteenth Day of October, 2002

*Attest:*

*Attesting Officer*

JAMES E. ROGAN
*Director of the United States Patent and Trademark Office*